(12) United States Patent
Jia et al.

(10) Patent No.: US 11,947,163 B2
(45) Date of Patent: Apr. 2, 2024

(54) METHODS AND SYSTEMS FOR DISTRIBUTED TEMPERATURE AND PRESSURE SENSING COMPRISING A POLYMER FIBER

(71) Applicant: Virginia Tech Intellectual Properties, Inc., Blacksburg, VA (US)

(72) Inventors: Xiaoting Jia, Blacksburg, VA (US); Anbo Wang, Blacksburg, VA (US); Haifeng Xuan, Blacksburg, VA (US); Li Yu, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 669 days.

(21) Appl. No.: 16/893,281

(22) Filed: Jun. 4, 2020

(65) Prior Publication Data
US 2020/0386939 A1 Dec. 10, 2020

Related U.S. Application Data

(60) Provisional application No. 62/857,095, filed on Jun. 4, 2019.

(51) Int. Cl.
| | |
|---|---|
| *G02B 6/10* | (2006.01) |
| *D01D 5/00* | (2006.01) |
| *D01D 5/084* | (2006.01) |
| *D01D 5/098* | (2006.01) |
| *D01D 5/34* | (2006.01) |

(Continued)

(52) U.S. Cl.
CPC ............. *G02B 6/10* (2013.01); *D01D 5/0023* (2013.01); *D01D 5/084* (2013.01); *D01D 5/098* (2013.01); *D01D 5/34* (2013.01); *D02G 3/441* (2013.01); *D03D 1/0088* (2013.01); *D06M 11/00* (2013.01); *D06M 15/00* (2013.01); *H01B 3/00* (2013.01); *H01B 3/02* (2013.01); *H01B 3/082* (2013.01); *H01B 3/12* (2013.01); *H01B 3/30* (2013.01); *H01B 7/04* (2013.01); *H01B 19/04* (2013.01); *D10B 2101/20* (2013.01); *D10B 2401/16* (2013.01); *D10B 2401/18* (2013.01); *G01L 9/0002* (2013.01);

(Continued)

(58) Field of Classification Search
None
See application file for complete search history.

(56) References Cited

FOREIGN PATENT DOCUMENTS

WO WO2006121818 * 11/2006

* cited by examiner

*Primary Examiner* — Shawn Mckinnon
(74) *Attorney, Agent, or Firm* — Johnson, Marcou, Isaacs & Nix; John S. Sears

(57) ABSTRACT

In one aspect, the disclosure relates to multi-material fibers capable of distributedly measuring temperature and pressure in which the methods comprise a thermal drawing step, and the methods of fabricating the disclosed fibers. The fibers can be utilized in methods of temperature and pressure mapping or sensing comprising electrical reflectometry for interrogation. Further disclosed are devices comprising a disclosed fiber with the multi-point detection capability with simple one-end connection. Also disclosed are articles, e.g., smart clothing, wound dressing, robotic skin and other industrial products, comprising a disclosed fiber or a fabric comprising a disclosed fiber. This abstract is intended as a scanning tool for purposes of searching in the particular art and is not intended to be limiting of the present disclosure.

19 Claims, 21 Drawing Sheets

(51) Int. Cl.
*D02G 3/44* (2006.01)
*D03D 1/00* (2006.01)
*D06M 11/00* (2006.01)
*D06M 15/00* (2006.01)
*H01B 3/00* (2006.01)
*H01B 3/02* (2006.01)
*H01B 3/08* (2006.01)
*H01B 3/12* (2006.01)
*H01B 3/30* (2006.01)
*H01B 7/04* (2006.01)
*H01B 19/04* (2006.01)
*G01L 9/00* (2006.01)
*G02B 6/12* (2006.01)

(52) U.S. Cl.
CPC .............. *G02B 2006/12069* (2013.01); *G02B 2006/12111* (2013.01); *G02B 2006/12166* (2013.01)

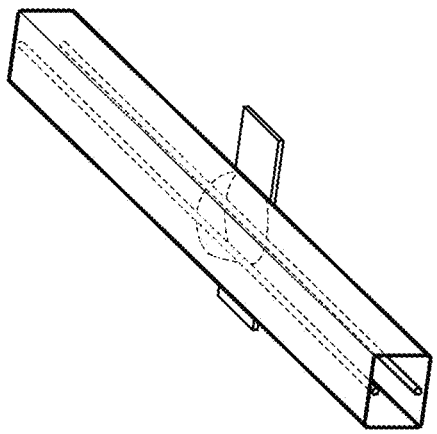
FIG. 5A
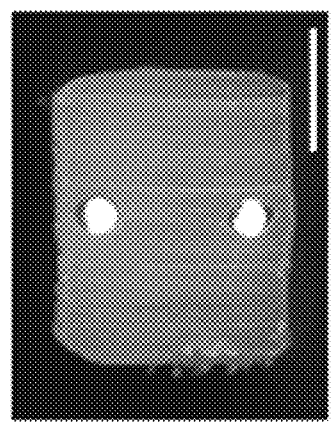
FIG. 5B
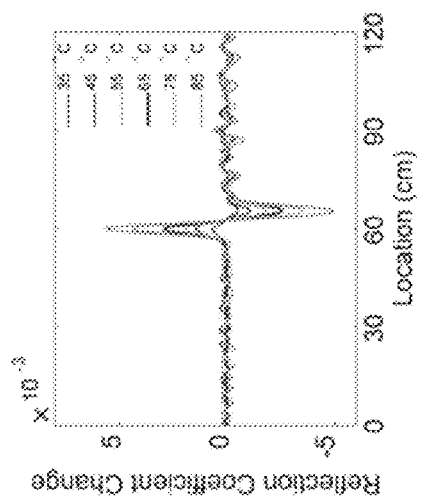
FIG. 5C
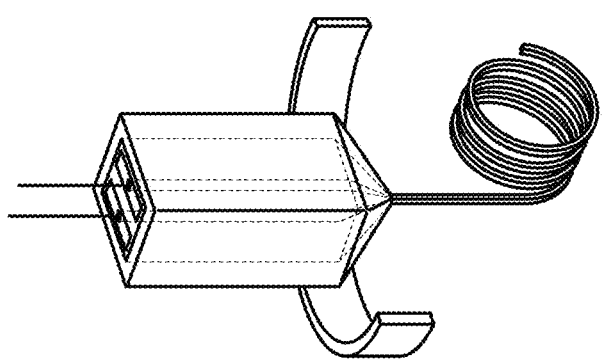
FIG. 5D
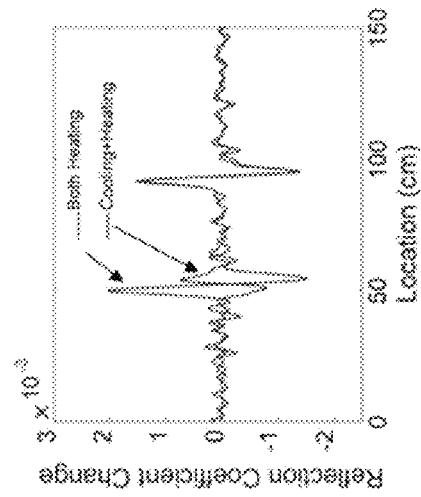
FIG. 5E
FIG. 5F

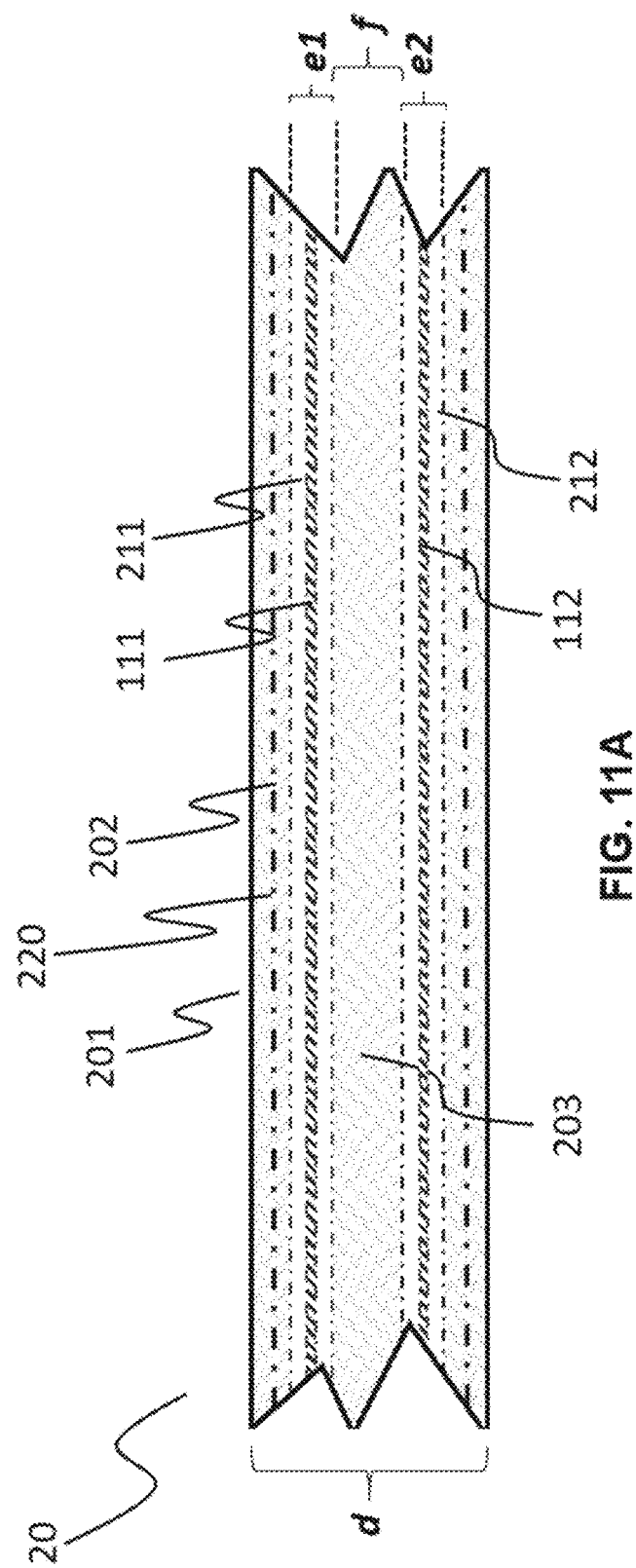

METHODS AND SYSTEMS FOR DISTRIBUTED TEMPERATURE AND PRESSURE SENSING COMPRISING A POLYMER FIBER

CROSS-REFERENCE TO RELATED APPLICATIONS

This application claims the benefit of U.S. Provisional Application No. 62/857,095, filed on Jun. 4, 2019, which is incorporated herein by reference in its entirety.

STATEMENT REGARDING FEDERALLY SPONSORED RESEARCH

This disclosure was made with U.S. Government support under grant number 1847436, awarded by the National Science Foundation. The U.S. government has certain rights in the disclosure.

BACKGROUND

The advent of smart textiles and wearable gadgets has led to the development of various flexible devices that sense and respond to environmental conditions. In view of these developments, there is an increasing need for novel flexible devices capable of sensing, communicating and interacting with humans and the environment. Among all types of flexible sensors, pressure and temperature sensors are of particular importance. Pressure sensors are commonly used in human interfacing, and temperature sensors are widely used in personal and environmental monitoring. According to their fabrication methods, these flexible sensors can be broadly categorized into thin film sensors, and polymer fiber-based sensors. Most of the existing flexible pressure and temperature sensors are produced using thin film technologies (M. Amjadi, et al., Advanced Functional Materials 2016, 26, 1678; Z. Lou, et al. Nano Energy 2017, 38, 28; and Yamada, Y. et al. Nature Nanotechnology 2011, 6, 296).

For smart textile and wearable applications, polymer fiber-based sensors are advantageous, due to the breathability, durability, wear resistance, and the stretchability offered by fabric structures. The most commonly used methods for polymer fiber fabrication include spinning, extrusion, and thermal drawing. The thermal drawing technique, adapted from the silica optical fiber manufacturing, involves design and preparation of a macroscopic "preform", and thermally drawing the "preform" into fibers with preserved structures. Unlike the other methods, the thermal drawing technique allows for multi-materials (metal, semiconductor, and insulator) to be co-drawn inside a polymer matrix; therefore it enables the fabrication of flexible fiber-based sensors. Although there have been reports of thermal and pressure sensing fibers produced using the thermal drawing technique. However, none of these fibers are capable of fully-distributed temperature or pressure sensing.

A fully-distributed fiber-based sensing system with the capability of monitoring the surrounding environment and providing independent readings from multiple locations would take the full advantage of fiber's structural versatility and textile production compatibility. One major category of distributed sensing systems is optical fiber-based sensing systems. Optical fiber sensing techniques include fiber Bragg grating (FBG) array, Raman scattering distributed temperature sensing (DTS), Brillouin optical time domain reflectometry/analysis (BOTDR/BOTDA), and optical frequency domain reflectometry (OFDR). Polymer optical fiber has also been used for distributed sensing because of polymers' smaller Young's modulus and better flexibility compared with that of silica. Optical sensing systems can provide high resolution and sensitivity, however, most conventional systems use silica fibers, and require bulky optical instrument, making them not suitable for smart textile or wearable applications.

Despite advances in research directed to smart textiles and wearable gadgets, there is still a scarcity of flexible fiber materials that can be readily fabricated, e.g., by thermal drawing methods, and at the same time provide fully-distributed pressure and temperature mapping. In particular, there is a need for methods of fabricating multi-material fibers capable of distributedly measuring temperature and pressure using the thermal drawing technique. Moreover, it is desirable that such fibers have embedded copper electrodes which act as parallel wire transmission lines. There is a need for flexible fibers that use electrical reflectometry for interrogation provides the fiber with the multi-point detection capability with simple one-end connection. These needs and other needs are satisfied by the present disclosure.

SUMMARY

In accordance with the purpose(s) of the disclosure, as embodied and broadly described herein, the disclosure, in one aspect, relates to methods of fabricating multi-material fibers capable of distributedly measuring temperature and pressure in which the methods comprise a thermal drawing step. The fibers produced by the disclosed methods can be utilized in methods of temperature and pressure mapping comprising electrical reflectometry for interrogation. Further disclosed are devices comprising a disclosed fiber with the multi-point detection capability with simple connections, e.g., one-end or two-end connections. Also disclosed are articles, e.g., smart clothing, wound dressing, robotic skin and other industrial products, comprising a disclosed fiber or a fabric comprising a disclosed fiber.

Disclosed are fibers comprising: a supporting material surrounding two electrodes; wherein the two electrodes are separated by an inter-electrode space; wherein the inter-electrode space comprises the supporting material and is continuous with the supporting material surrounding the two electrodes; wherein the two electrodes are arranged parallel to one another; and wherein the two electrodes are parallel to an outer surface of the fiber.

Also disclosed are devices for distributed sensing comprising a disclosed fiber, wherein the disclosed fiber is configured to connect to a device for measuring impedance variation.

Also disclosed are methods of fabricating a disclosed fiber, the method comprising: thermally drawing a preform comprising a supporting material comprising two channels; wherein each channel comprises an electrode; wherein the two channels are separated by an inter-electrode space; wherein the inter-electrode space comprises the supporting material and is continuous with the supporting material surrounding the two channels; wherein the two channels are arranged parallel to one another; and wherein the two channels are parallel to an outer surface of the preform.

Also disclosed are articles comprising the disclosed fibers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE FIGURES

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A shows reflectometry for a representative disclosed sensing fiber, the dashed line represents the local impedance and the arrow represents forward transmitting electric signal and the reflection signal at each of the location where impedance changes. FIG. 1B shows a representative detection scheme for a disclosed distributed sensing fiber. The vector network analyzer (VNA) can use frequency scanning to acquire the frequency response (amplitude and phase) of the fiber and transforms the data to the time domain while the PC reconstructs the pressure/temperature distribution from the VNA output.

FIG. 2A shows a schematic representation of a disclosed convergence thermal drawing method for fabrication of a disclosed pressure sensing fiber. In the aspect shown, the fiber has a sandwich structure surrounded by a cladding layer. FIGS. 2B-2D show, respectively, optical microscopic image of fiber cross section before etching; fiber cross section after etching; and drawn fiber show good flexibility (scale bar is 200 μm).

FIG. 3A shows a representative schematic drawing of a disclosed fiber deformation under pressure. FIG. 3B shows representative reflection coefficient change recorded by VNA when a disclosed pressure sensing fiber was pressed with a finger, moving 5 cm each time. Each negative-positive peak pair represents the fiber in between is being pressed. FIG. 3C shows representative time delay vs. location relationship data showing the time delay increases linearly with position shifting. FIG. 3D shows representative reflection coefficient change under pressure data measured at two points along the fiber. FIG. 3E shows representative pressure sensitivity vs. pressure derived data from Equation (4).

FIG. 4A shows a representative 2D grid with finger stimulation. FIG. 4B show representative data from obtained finger stimulation of a disclosed pressure sensing fiber as shown in FIG. 4A. FIG. 4C shows a representative reconstructed pressure map from the finger stimulation data obtained in FIG. 4B. FIG. 4D shows a representative 2D grid with weight stimulation at two locations, i.e., 200 g at 80 cm and 20 g at 120 cm. FIG. 4E show representative data from obtained weight stimulation of a disclosed pressure sensing fiber as shown in FIG. 4D. FIG. 4F shows a representative reconstructed pressure map from the weight stimulation data obtained in FIG. 4E.

FIGS. 5A-5F show representative schematic drawings and data pertaining to a representative measurement of a disclosed temperature sensing fiber. FIG. 5A shows a representative schematic drawing of convergence thermal drawing for a disclosed temperature sensing fiber. FIG. 5B shows a representative optical microscope image of a disclosed temperature sensing fiber comprising LDPE fiber with 125 μm copper electrodes (scale bar is 500 μm). FIG. 5C shows a representative schematic drawing a disclosed temperature sensing fiber being heated at one location. FIG. 5D shows representative reflection coefficient change data obtained when the disclosed temperature sensing LPDE fiber (described in FIG. 5B) is attached to two thermoelectric coolers (TECs). The data curves show both TECs are heating (lighter line) and first one is cooling while the second one is heating (darker line). FIG. 5E shows representative temperature response data when one section of the disclosed temperature sensing LPDE fiber (described in FIG. 5B) was heated in a furnace at the indicated temperatures. FIG. 5F shows representative coefficient change vs. temperature relationship calculated from the data shown in FIG. 5E.

FIG. 7A shows direct data from VNA transformation, whereas FIG. 7B shows data corrected by post-processing to remove attenuation error.

FIG. 8A shows a cross sectional image of the PVDF fiber (scale bar is 500 μm). FIG. 8B shows representative temperature response data obtained using the fiber shown in FIG. 8A. FIG. 8C shows reflection coefficient change vs. temperature using the fiber shown in FIG. 8A.

FIG. 9A is a photographic image of a finger pressing a disclosed pressure sensing fiber to calibrate the time delay vs. distance relationship. FIG. 9B is a photographic image showing a representative apparatus for applying pressure comprising a disclosed pressure sensing fiber is fixed on top of a digital scale and a linear stage comprising a polymer block to apply uniform pressure to the fiber in which force can be determined by the scale reading. FIG. 9C is a photographic image showing two segments of a disclosed temperature-sensing fiber attached to two TECs so they can be heated or cooled independently. FIG. 9D is a photographic image showing a representative apparatus for temperature calibration comprising a disclosed temperature sensing fiber passed through a 5 cm small tube furnace; a power supply providing DC current to the furnace; and a thermocouple to measure the temperature inside the furnace.

FIG. 10A shows a cross-section view along a longitudinal or long axis of a disclosed fiber. FIG. 10B shows a cross-section view along an axis perpendicular to the longitudinal or long axis of a disclosed fiber in which the cross-sectional geometry of the fiber is circular, and the supporting material and inter-electrode material comprise the same material. FIG. 10C shows a cross-section view along an axis perpendicular to the longitudinal or long axis of a disclosed fiber in which the cross-sectional geometry of the fiber is circular, and the supporting material and inter-electrode material comprise the different materials. FIG. 10D shows a cross-section view along an axis perpendicular to the longitudinal or long axis of a disclosed fiber in which the cross-sectional geometry of the fiber is rectangular, and the supporting material and inter-electrode material comprise the different materials.

FIGS. 11A-11D show representative cross-sectional schematic drawings of disclosed preform comprising channels and electrodes within the channels before thermal drawing to form the fibers of FIGS. 10A-10D. FIG. 11A shows a cross-section view along a longitudinal or long axis of a disclosed preform. FIG. 11B shows a cross-section view along an axis perpendicular to the longitudinal or long axis of a disclosed preform in which the cross-sectional geometry of the preform is circular, and the supporting material and inter-electrode material comprise the same material. FIG. 11C shows a cross-section view along an axis perpendicular to the longitudinal or long axis of a disclosed preform in which the cross-sectional geometry of the preform is circular, and the supporting material and inter-electrode material comprise the different materials. FIG. 11D shows a cross-section view along an axis perpendicular to the longitudinal or long axis of a disclosed preform in which the cross-sectional geometry of the preform is rectangular, and the supporting material and inter-electrode material comprise the different materials.

FIG. 12A shows a cross-section view along an axis perpendicular to the longitudinal or long axis of a disclosed fiber in which the cross-sectional geometry of the fiber is circular, the supporting material and inter-electrode material comprise the same material, and comprising three electrodes. FIG. 12B shows a cross-section view along an axis perpendicular to the longitudinal or long axis of a disclosed fiber in which the cross-sectional geometry of the fiber is rectangular, the supporting material and inter-electrode material comprise the different materials, and comprising four electrodes.

Figure 1A:
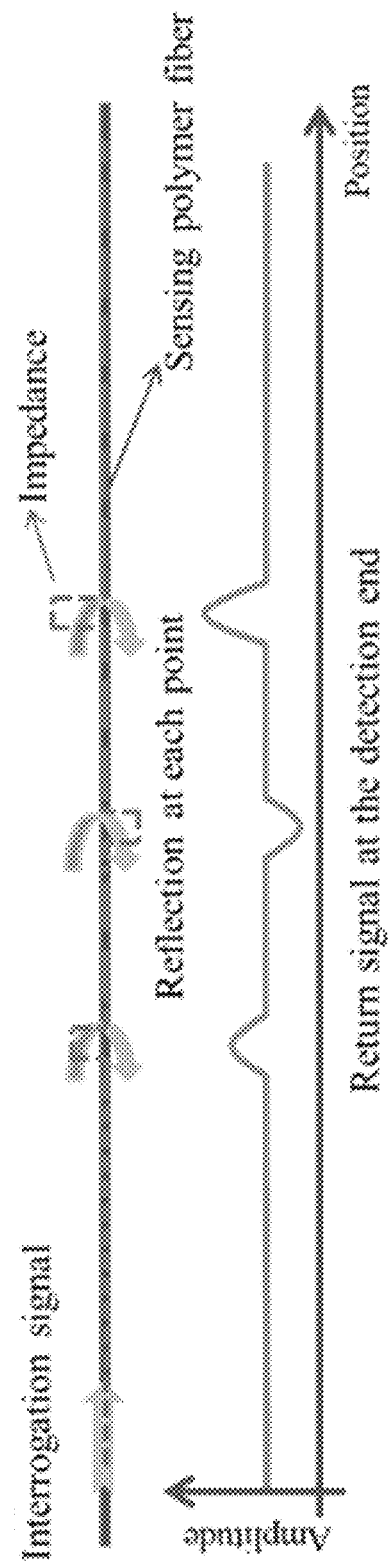
FIGS. 1A-1B show schematic representations of the sensing principle of the disclosed reflectometry based distributed sensing fibers.
Figure 1B:
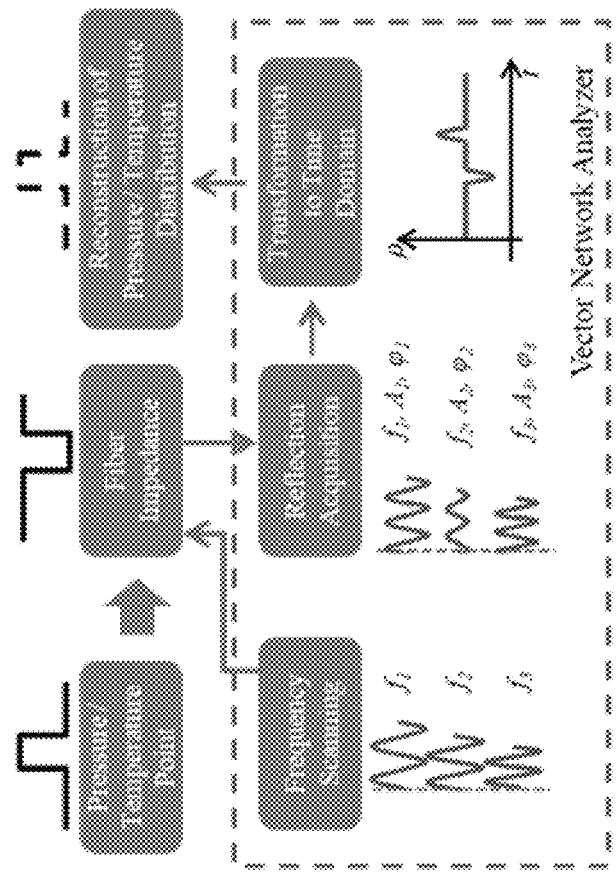

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

Reference to "a" chemical compound refers to one or more molecules of the chemical compound rather than being limited to a single molecule of the chemical compound. Furthermore, the one or more molecules may or may not be identical, so long as they fall under the category of the chemical compound. Thus, for example, "a" chemical compound is interpreted to include one or more molecules of the chemical, where the molecules may or may not be identical (e.g., different isotopic ratios, enantiomers, and the like).

As used in the specification and the appended claims, the singular forms "a," "an" and "the" include plural referents unless the context clearly dictates otherwise. Thus, for example, reference to "a polymer," "an electrode," or "a device," includes, but is not limited to, two or more such polymers, electrodes, devices, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

B. Fibers

In one aspect, the disclosure relates to fibers that can be used in devices, methods of sensing or measurement, and articles. The disclosed fibers, when interfaced to suitable devices, cable of detecting changes in impedance, e.g., as a result of changes in distance separating electrodes and/or changes in the dielectric properties of the inter-electrode material due to a stimuli, at one or more positions along the fiber, including a multiplicity of positions. The change in impedance can be utilized to detect or sense changes in environmental variables such as, but not limited to, temperature or pressure. For example, changes in impedance can, depending on choice of inter-electrode material, be made sensitive to changes in magnetic field, piezoelectric properties, and/or chemical or liquid environment. As a non-limiting example, an inter-electrode material can be responsive, i.e., change physical dimensions and/or dielectric properties, due to interaction with a magnetic field or a chemical material that causes the inter-electrode material to alter physical dimensions (such as swelling or contracting) and/or dielectric properties (interaction cause a perturbation to the resting dielectric value of the inter-electrode material).

In one aspect, the present disclosure relates to fibers comprising: a supporting material surrounding an electrode assembly comprising an inter-electrode material surrounding at least two electrodes; wherein the at least two electrodes are separated by an inter-electrode distance; wherein the at least two electrodes are arranged parallel to one another; and wherein the at least two electrodes are parallel to an outer surface of the fiber. In some instances, the supporting material and inter-electrode material are essentially not the same material. Alternatively, the supporting material and inter-electrode material are essentially the same material. In a second alternative, the supporting material and inter-electrode material can comprise a mixture of materials, some of which are the same and some of which are different.

In one aspect, the present disclosure relates to fibers comprising: a supporting material surrounding two electrodes; wherein the at least two electrodes are separated by an inter-electrode space; wherein the inter-electrode space comprises the supporting material and is continuous with the supporting material surrounding the two electrodes; wherein the at least two electrodes are arranged parallel to one another; and wherein the at least two electrodes are parallel to an outer surface of the fiber.

In a further aspect, the fiber has a cross-sectional width of from about 100 µm to about 2.5 mm; about 200 µm to about 2 mm; about 200 µm to about 1 mm; or a range within any of the foregoing ranges; or a value or set of values within any of the foregoing ranges. It is understood that in the foregoing, the cross-sectional width represents the longest dimension in a cross-section that is perpendicular to the longitudinal or long axis of the fiber and can have a variety of geometries in the cross-section. For example, if the cross-sectional geometry of the fiber is circular, then the cross-sectional distance would be tantamount to the diameter of that cross-sectional plane. Alternatively, if the cross-sectional geometry of the fiber is rectangular, then the cross-sectional distance would represent the length of the longest side of the rectangle defining the cross-sectional plane.

In a further aspect, the fiber has a cross-sectional geometry that is circular, rectangular, square, triangular, or ovular.

In a further aspect, the fiber has a pressure sensitivity, determined using electrical reflectometry to interrogate impedance change along the fiber, of from about 0.1 kPa to about 20 kPa; 1 kPa to about 20 kPa; 2.5 kPa to about 10 kPa; or a range within any of the foregoing ranges; or a value or set of values within any of the foregoing ranges. In some instances, the electrical reflectometry is frequency domain reflectometry. Alternatively, the electrical reflectometry is time domain reflectometry.

In a further aspect, the fiber has a temperature sensitivity, determined using electrical reflectometry to interrogate impedance change along the fiber, of from about 0.1° C. to about 10° C.; about 0.1° C. to about 5° C.; about 0.5° C. to about 2.5° C.; or a range within any of the foregoing ranges; or a value or set of values within any of the foregoing ranges.

In some instances, the electrical reflectometry is frequency domain reflectometry. Alternatively, the electrical reflectometry is time domain reflectometry.

In various aspects, the supporting material can comprise any suitable material that has a suitable dielectric constant and can be utilized in a thermal drawing process for forming a fiber. In a further aspect, the supporting material comprises a polymer, a ceramic material, a silica material, a glass material, or combinations thereof. In a further aspect, the supporting material can comprise a ceramic material. In a still further aspect, the supporting material can comprise a silica material. In yet a further aspect, the supporting material can comprise a glass material. In a further aspect, the supporting material can comprise a polymer.

In a further aspect, the supporting material can comprise a polymer such as a thermoplastic polymer, a thermoplastic elastomer, and combinations thereof. In some instances, the polymer can be a thermoplastic polymer such as, but not limited to, a polyester, a polyether, a polycarbonate, a polyolefin, a polyetherimide, a vinyl polymer, combinations thereof, or copolymers thereof. In a further aspect, the vinyl polymer can be a polyacrylate, a polypropylene, a polyethylene, a polystyrene, a polybutylene, a polyacrylnitrile, a polyvinylacetate, a poly(methyl methacrylate), a polyisoprene, combinations thereof, or copolymers thereof. Suitable polyethylenes can be a low-density polyethylene. In a further aspect, the thermoplastic polymer is a polycarbonate.

In a further aspect, the supporting material can comprise a polymer that is a thermoplastic elastomer such as, but not limited to, a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

In various further aspects, a supporting material can comprise a ceramic material, a glass material, or a silica material, e.g., a low melt glass.

In a further aspect, the supporting material has a Young's modulus of from about 10 KPa to about 100 GPa; about 1 MPa to about 10 GPa; about 1 MPa to about 1 GPa; about 0.1 MPa to about 5 MPa; about 0.5 MPa to about 2.5 MPa; or a range within any of the foregoing ranges; or a value or set of values within any of the foregoing ranges.

In various aspects, the inter-electrode material can be any suitable material that has a suitable dielectric constant and can be utilized in a thermal drawing process for forming a fiber. In a further aspect, the inter-electrode material can comprise a polymer, a ceramic material, a silica material, a glass material, or combinations thereof. In various aspects, the inter-electrode material can comprise a polymer, a ceramic material, a silica material, a glass material, or combinations thereof, in which the inter-electrode material is a porous material or comprises air cavities therein. In a further aspect, the inter-electrode material can comprise a ceramic material. In a still further aspect, the inter-electrode material can comprise a silica material. In yet a further aspect, the inter-electrode material can comprise a glass material. In a further aspect, the inter-electrode material can comprise a polymer.

In a further aspect, the inter-electrode material can comprise polymer such as a thermoplastic polymer, a thermoplastic elastomer, and combinations thereof. In some instances, the polymer can be a thermoplastic polymer such as, but not limited to, a polyester, a polyether, a polycarbonate, a polyolefin, a polyetherimide, a vinyl polymer, combinations thereof, or copolymers thereof. In a further aspect, the vinyl polymer can be a polyacrylate, a polypropylene, a polyethylene, a polystyrene, a polybutylene, a polyacrylnitrile, a polyvinylacetate, a poly(methyl methacrylate), a polyisoprene, combinations thereof, or copolymers thereof. Suitable polyethylenes can be a low-density polyethylene. In a further aspect, the thermoplastic polymer is a polycarbonate. In various aspects, the inter-electrode material can comprise a polymer wherein the polymer is a porous polymer or comprises air cavities therein. In some aspects, the polymer is formed into a mesh structure, wherein the mesh openings are on a nanoscale or microscale in size. In a further aspect, the polymer is formed as an open-cell or closed-cell foam structure.

In a further aspect, the inter-electrode material can comprise a polymer that is thermoplastic elastomer such as, but not limited to, a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

In various further aspects, an inter-electrode material can comprise a ceramic material, a glass material, a silica material, e.g., a low melt glass. In various aspects, the inter-electrode material can comprise a ceramic material, a silica material, a glass material, or combinations thereof, in which the inter-electrode material is a porous material or comprises air cavities therein.

In a further aspect, the inter-electrode material has a Young's modulus of from about 10 KPa to about 100 GPa; about 1 MPa to about 10 GPa; about 1 MPa to about 1 GPa; about 0.1 MPa to about 5 MPa; about 0.5 MPa to about 2.5 MPa; or a range within any of the foregoing ranges; or a value or set of values within any of the foregoing ranges.

In a further aspect, each of the at least two electrodes comprise an electrically conductive material such as a metal, a metal alloy, a conductive polymer, or combinations thereof. For example, each of the at least two electrodes can be independently selected from iron, copper, gold, aluminum, silver, tungstens, combinations thereof, or alloys thereof. For example, an electrode comprising steel, an alloy of iron and carbon, would be suitable. In some instances, the electrode is a solid wire. In other instances, the electrode can be braided or twisted wire structure comprising a multiplicity of individual wire filaments. In a still further aspect, each of the at least two electrodes comprise essentially the same material.

In a further aspect, the electrode has a cross-sectional geometry that is circular, rectangular, square, triangular, or ovular.

In a further aspect, each of the at least two electrodes has a cross-sectional width of from about 10 μm to about 1 mm; about 10 μm to about 500 μm; about 25 μm to about 500 μm; about 50 μm to about 500 μm; or a range within any of the foregoing ranges; about 100 μm to about 500 μm; or a range within any of the foregoing ranges; or a value or set of values within any of the foregoing ranges. It is understood that in the foregoing, the cross-sectional width represents the longest dimension in a cross-section that is perpendicular to the longitudinal or long axis of the electrode and can have a variety of geometries in the cross-section. For example, if the cross-sectional geometry of the electrode is circular, then the cross-sectional distance would be tantamount to the diameter of that cross-sectional plane. Alternatively, if the cross-sectional geometry of the electrode is rectangular, then the cross-sectional distance would represent the length of the longest side of the rectangle defining the cross-sectional plane.

In a further aspect, the inter-electrode space is from about 0.1 μm to about 1 mm; about 1 μm to about 1 mm; about 1 μm to about 750 μm; about 10 μm to about 500 μm; or a range within any of the foregoing ranges; or a value or set of values within any of the foregoing ranges. It is understood that the inter-electrode space is the distance between the outer surface of a given pair of electrodes.

Referring now to FIGS. 10A-12B, the following reference numbers are used therein and have the same meaning when used in different drawings, unless specified otherwise.

| Ref. No. | Name |
| --- | --- |
| 10 | fiber |
| 20 | preform |
| 101 | fiber outside edge |
| 102 | fiber supporting material |
| 103 | fiber inter-electrode material |
| 111 | first electrode |
| 112 | second electrode |
| 113 | third electrode |
| 114 | fourth electrode |
| 120 | fiber electrode assembly |
| 201 | preform outside edge |
| 202 | preform supporting material |
| 203 | preform inter-electrode material |
| 211 | first electrode |
| 212 | second electrode |
| 213 | third electrode |
| 214 | fourth electrode |
| 220 | preform electrode assembly |
| a1 | first electrode cross-sectional length |
| a2 | second electrode cross-sectional length |
| b | inter-electrode distance |
| c | fiber cross-sectional length |
| d | preform cross-sectional length |
| e1 | first channel cross-sectional length |
| e2 | second channel cross-sectional length |
| f | inter-electrode distance |

Figure 10A:
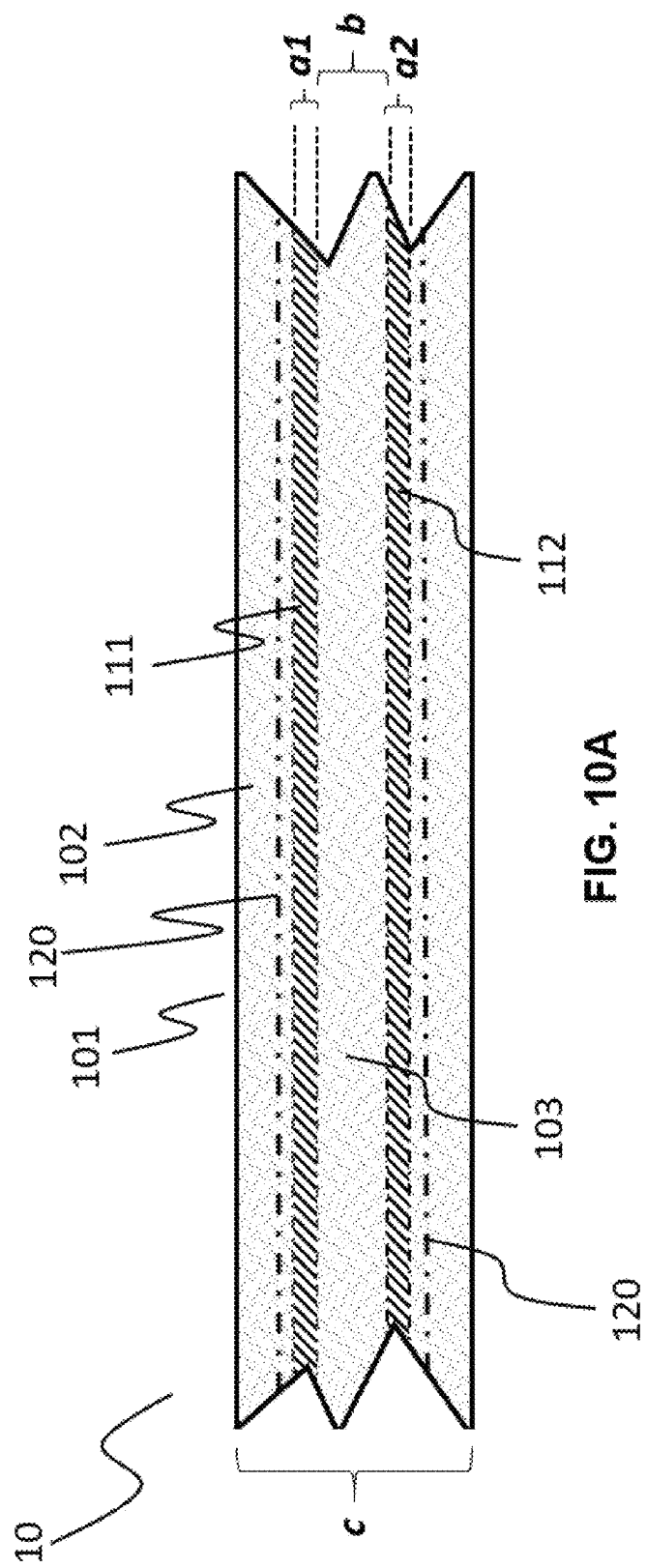
FIGS. 10A-10D show representative cross-sectional schematic drawings of disclosed fibers.

Referring now to FIGS. 10A-10D which show representative cross-sectional schematic drawings of disclosed fibers. FIG. 10A shows a fiber 10 is shown as a cross-sectional plane along the longitudinal or long axis of a disclosed fiber, i.e., along the length of a fiber, showing a fiber outside edge 101 demarking an outside surface. The fiber 10 comprises a fiber supporting material 102 surrounding a fiber electrode assembly 120 comprising a first electrode 111 and a second electrode 112, with an inter-electrode material 103 therein surrounding the first electrode 111 and the second electrode 112. The fiber is associated with a cross-sectional width c, and each of the first electrode 111 and the second electrode 112 are associated with an electrode cross-sectional width, a1 and a2, respectively. The first electrode 111 and the second electrode 112 spaced from one another by an inter-electrode distance b. In this figure, the supporting material and the inter-electrode material comprise essentially the same material or mixture of materials.

Figure 10B:
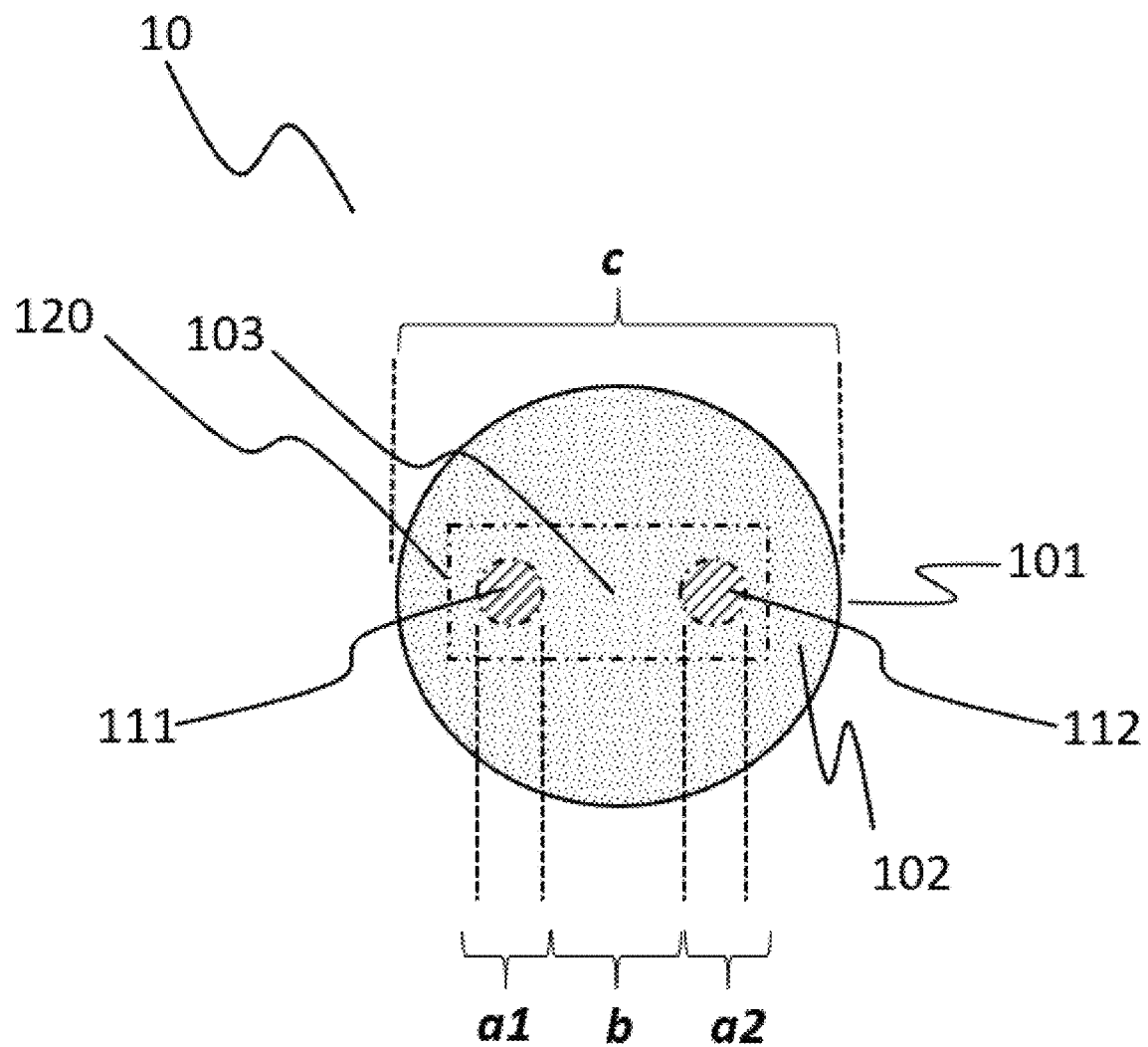
Figure 10C:
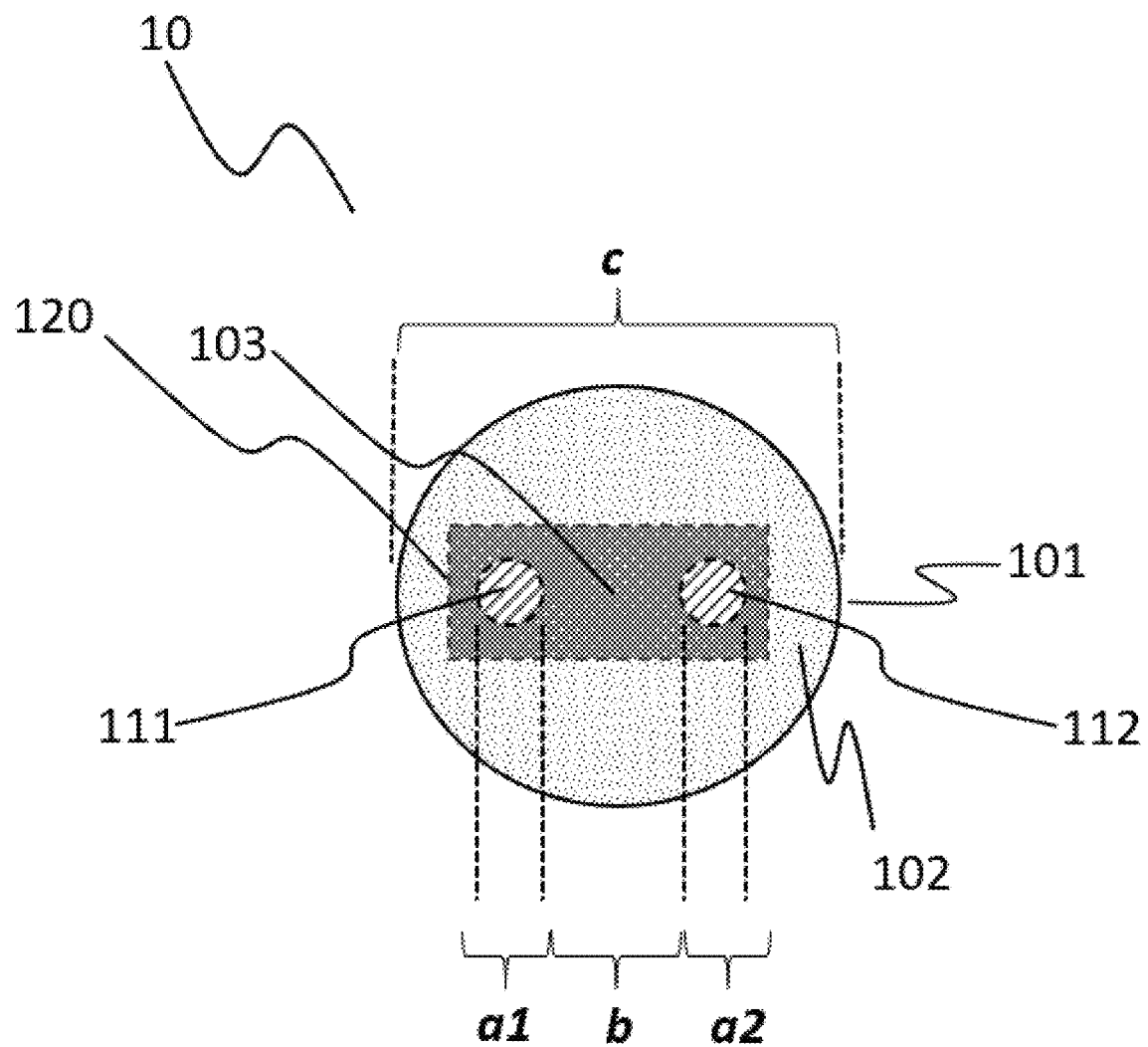
Figure 10D:
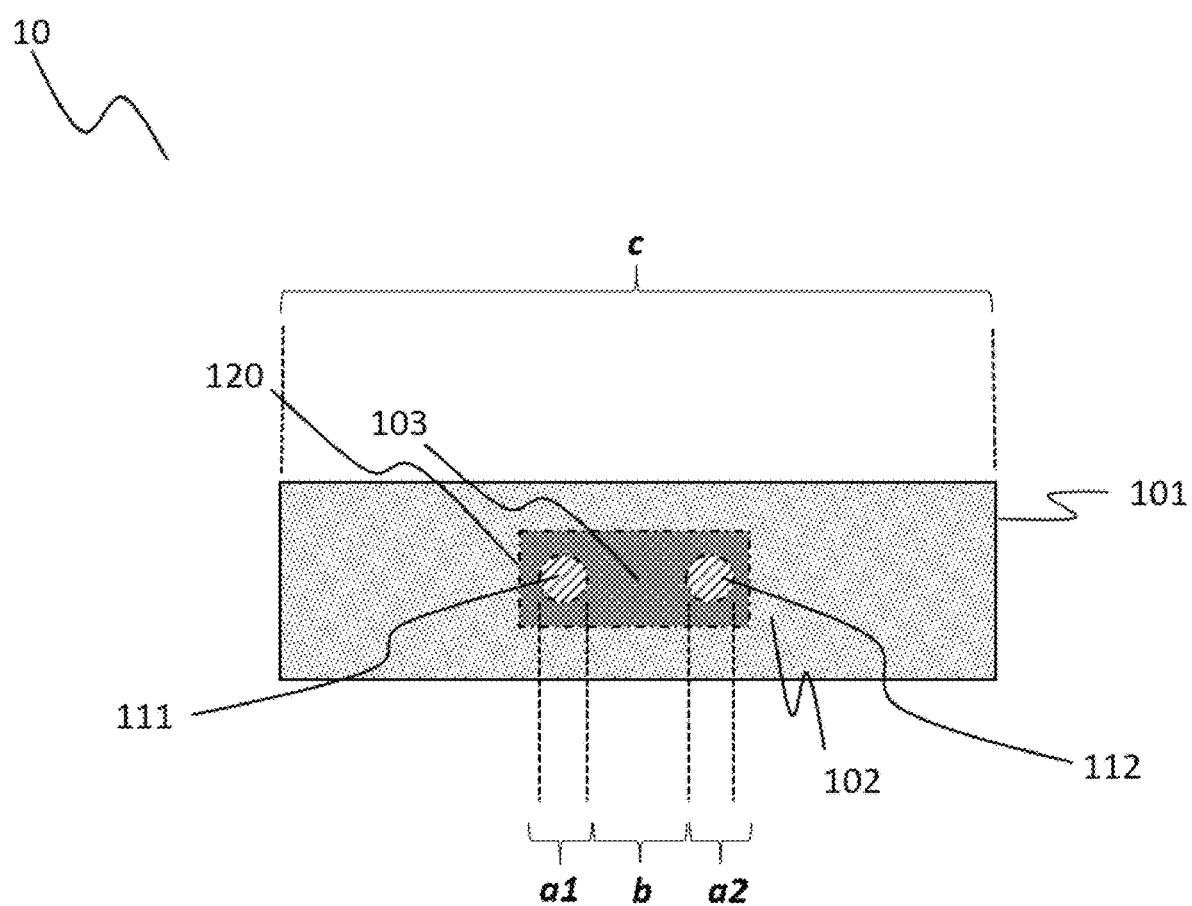

FIG. 10B shows a cross-section view along an axis perpendicular to the longitudinal or long axis of a disclosed fiber in which the cross-sectional geometry of the fiber is circular, and the supporting material and inter-electrode material comprise the same material. In this figure, the supporting material and the inter-electrode material comprise essentially the same material or mixture of materials. The fiber electrode assembly shown in this figure has a rectangular cross-sectional geometry, but it is understood that other cross-sectional geometries are contemplated by the present disclosure as described herein above. In this figure, each of the first electrode 111 and the second electrode 112 are shown with a circular cross-sectional geometry, but it is understood that other cross-sectional geometries are contemplated for the electrodes by the present disclosure as described herein above. FIG. shows a cross-section view along an axis perpendicular to the longitudinal or long axis of a disclosed fiber in which the cross-sectional geometry of the fiber is circular, and the supporting material and inter-electrode material comprise the different materials. In this figure, the supporting material and the inter-electrode material comprise essentially different materials or mixture of materials. The fiber electrode assembly shown in this figure has a rectangular cross-sectional geometry, but it is understood that other cross-sectional geometries are contemplated by the present disclosure as described herein above. FIG. 10D shows a cross-section view along an axis perpendicular to the longitudinal or long axis of a disclosed fiber in which the cross-sectional geometry of the fiber is rectangular, and the supporting material and inter-electrode material comprise the different materials. In this figure, the supporting material and the inter-electrode material comprise essentially different materials or mixture of materials. The fiber electrode assembly shown in this figure has a rectangular cross-sectional geometry, but it is understood that other cross-sectional geometries are contemplated by the present disclosure as described herein above.

Figure 12A:
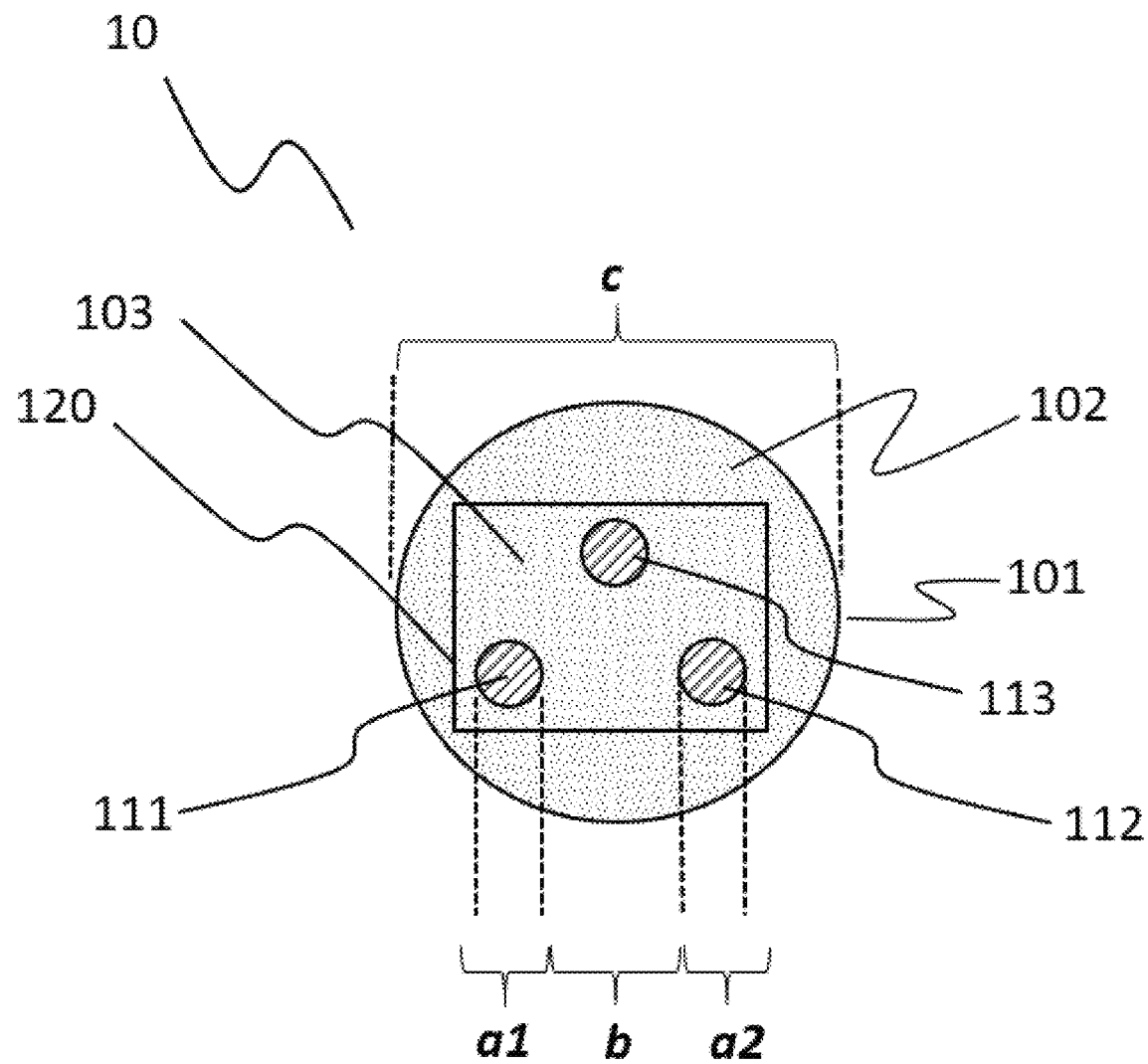
FIGS. 12A-12B show representative cross-section view along an axis perpendicular to the longitudinal or long axis of a disclosed fiber.
Figure 12B:
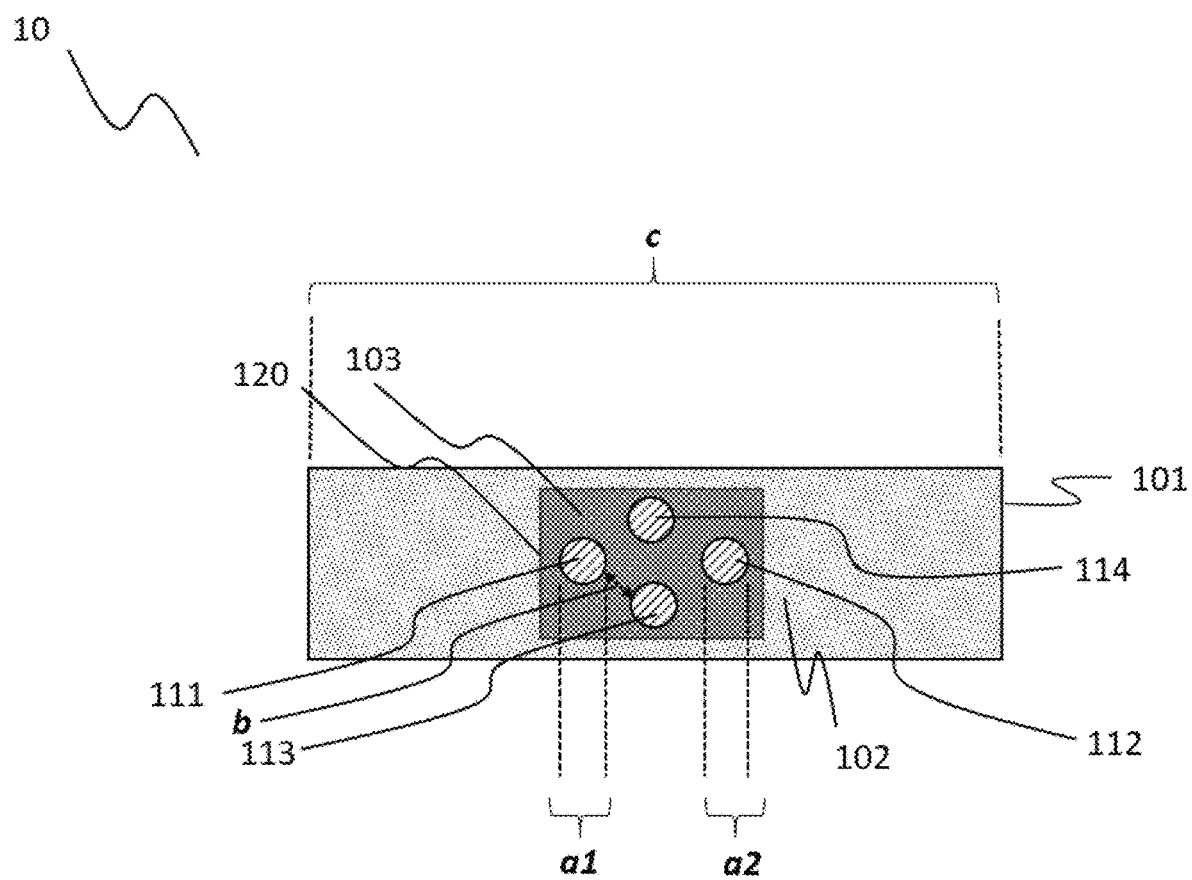

Referring now to FIGS. 12A and 12B, which show representative cross-sectional schematic drawings of disclosed fibers having more than two electrodes in each fiber. FIG. 12A shows a fiber 10 is shown as a cross-sectional plane along the longitudinal or long axis of a disclosed fiber, i.e., along the length of a fiber, showing a fiber outside edge 101 demarking an outside surface. The fiber 10 comprises a fiber supporting material 102 surrounding a fiber electrode assembly 120 comprising a first electrode 111, a second electrode 112, and a third electrode 113 with an inter-electrode material 103 therein surrounding the first electrode 111, the second electrode 112, and the third electrode 113. The fiber is associated with a cross-sectional width c, and each of the first electrode 111 and the second electrode 112 are associated with an electrode cross-sectional width, a1 and a2, respectively. The first electrode 111 and the second electrode 112 spaced from one another by an inter-electrode distance b, and similarly the first electrode 111 and the third electrode 113 would be separated by an inter-electrode distance comparable or equal to the inter-electrode distance b. Moreover, it is understood that similarly the second electrode 112 and the third electrode 113 would be separated by an inter-electrode distance comparable or equal to the inter-electrode distance b. In this figure, the supporting material and the inter-electrode material comprise essentially the same material or mixture of materials. The fiber in this figure, when used in a disclosed device, can be configured such that the first electrode 111 and the second electrode 112 are sensitive to pressure, whereas the second electrode 112 and the third electrode 113 are configured to be sensitive to temperature.

FIG. 12B shows a cross-section view along an axis perpendicular to the longitudinal or long axis of a disclosed fiber in which the cross-sectional geometry of the fiber is rectangular, and the supporting material and inter-electrode material comprise the different materials. In this figure, the supporting material and the inter-electrode material comprise essentially different materials or mixture of materials. The fiber electrode assembly shown in this figure has a rectangular cross-sectional geometry, but it is understood that other cross-sectional geometries are contemplated by the present disclosure as described herein above. The figure shows a fiber 10 is shown as a cross-sectional plane along the longitudinal or long axis of a disclosed fiber, i.e., along the length of a fiber, showing a fiber outside edge 101 demarking an outside surface. The fiber 10 comprises a fiber supporting material 102 surrounding a fiber electrode assembly 120 comprising a first electrode 111, a second electrode 112, a third electrode 113, and a fourth electrode 114 with an inter-electrode material 103 therein surrounding the first electrode 111, the second electrode 112, the third electrode 113, and the fourth electrode 114. The fiber is associated with a cross-sectional width c, and each of the first electrode 111 and the second electrode 112 are associated with an electrode cross-sectional width, a1 and a2, respectively. The first electrode 111 and the second electrode 112 spaced from one another by an inter-electrode distance b, and similarly the first electrode 111 and the third electrode 113 would be separated by an inter-electrode distance comparable or equal to the inter-electrode distance b. Moreover, it is understood that similarly the second electrode 112 and the third electrode 113 would be separated by an inter-electrode distance comparable or equal to the inter-electrode distance b. Moreover, it is understood that similarly the second electrode 112 and the third electrode 114 would be separated by an inter-electrode distance comparable or equal to the inter-electrode distance b. In this figure, the supporting material and the inter-electrode material comprise essentially the same material or mixture of materials. The fiber in this figure, when used in a disclosed device, can be configured such that the first electrode 111 and the second electrode 112 are sensitive to temperature, whereas the third electrode 113 and the fourth electrode 114 are configured to be sensitive to vertical pressure.

C. Methods of Fabricating Fibers

The present disclosure relates to methods of fabricating of a disclosed, the method comprising: thermally drawing a preform comprising a supporting material comprising two channels; wherein each channel comprises an electrode; wherein the two channels are separated by an inter-electrode space; wherein the inter-electrode space comprises the supporting material and is continuous with the supporting material surrounding the two channels; wherein the two channels are arranged parallel to one another; and wherein the two channels are parallel to an outer surface of the preform.

In some instances, the preform can further comprise an outer layer comprising a material having a tensile modulus, a glass transition temperature, a melting temperature, a Young's modulus that is greater, respectively, than a tensile modulus, a glass transition temperature, a melting temperature, a Young's modulus of the supporting material. In instances in which the preform comprises an outer layer, upon completion of thermal drawing and formation of the fiber, the outer layer can be removed by various methods, including, but not limited to, an etch process such as a solvent etching process in which the outer layer is selectively solubilized. The outer layer forms a cladding to facilitate continuous thermal drawing, e.g., by providing a shell or cladding that can help maintain the structural integrity of the preform to mitigate deformation under heat and/or pressure associated with thermal drawing.

In a further aspect, the supporting material utilized in the preform can be any suitable material that has a suitable dielectric constant and can be utilized in a thermal drawing process for forming a fiber. In a further aspect, the supporting material is a polymer, e.g., a thermoplastic polymer or a thermoplastic elastomer. In some instances, the polymer can be a thermoplastic polymer such as, but not limited to, a polyester, a polyether, a polycarbonate, a polyolefin, a polyetherimide, a vinyl polymer, combinations thereof, or copolymers thereof. In a further aspect, the vinyl polymer can be a polyacrylate, a polypropylene, a polyethylene, a polystyrene, a polybutylene, a polyacrylnitrile, a polyvinylacetate, a poly(methyl methacrylate), a polyisoprene, combinations thereof, or copolymers thereof. Suitable polyethylenes can be a low-density polyethylene. In a further aspect, the thermoplastic polymer is a polycarbonate.

In various further aspects, the supporting material utilized in the preform can be a ceramic material, a glass material, or a silica material, e.g., a low melt glass.

In a further aspect, the supporting material utilized in the preform has a Young's modulus of from about 10 KPa to about 100 GPa; about 1 MPa to about 10 GPa; about 1 MPa to about 1 GPa; about 0.1 MPa to about 5 MPa; about 0.5 MPa to about 2.5 MPa; or a range within any of the foregoing ranges; or a value or set of values within any of the foregoing ranges.

In a further aspect, each of the at least two electrodes used in the method comprise an electrically conductive material such as a metal, a metal alloy, a conductive polymer. For example, each of the at least two electrodes can be independently selected from iron, copper, gold, aluminum, silver, tungstens, combinations thereof, or alloys thereof. For example, an electrode comprising steel, an alloy of iron and carbon, would be suitable. In some instances, the electrode is a solid wire. In other instances, the electrode can be braided or twisted wire structure comprising a multiplicity of individual filaments. In a still further aspect, each of the at least two electrodes comprises essentially the same material.

In a further aspect, the fiber formed by the disclosed method has a cross-sectional width of from about 100 μm to about 2.5 mm; about 200 μm to about 2 mm; about 200 μm to about 1 mm; or a range within any of the foregoing ranges; or a value or set of values within any of the foregoing ranges. The clarification regarding cross-sectional width above apply herein as well.

In a further aspect, each of the at least two electrodes in the preform has a cross-sectional width of from about 10 μm to about 1 mm; about 10 μm to about 500 μm; about 25 μm to about 500 μm; about 50 μm to about 500 μm; or a range within any of the foregoing ranges; about 100 μm to about 500 μm; or a range within any of the foregoing ranges; or a value or set of values within any of the foregoing ranges. The clarification regarding cross-sectional width above apply herein as well.

In a further aspect, the inter-electrode space, following forming the fiber in the method, is from about 0.1 μm to about 1 mm; about 1 μm to about 1 mm; about 1 μm to about 750 μm; about 10 μm to about 500 μm; or a range within any of the foregoing ranges; or a value or set of values within any of the foregoing ranges.

Figure 11B:
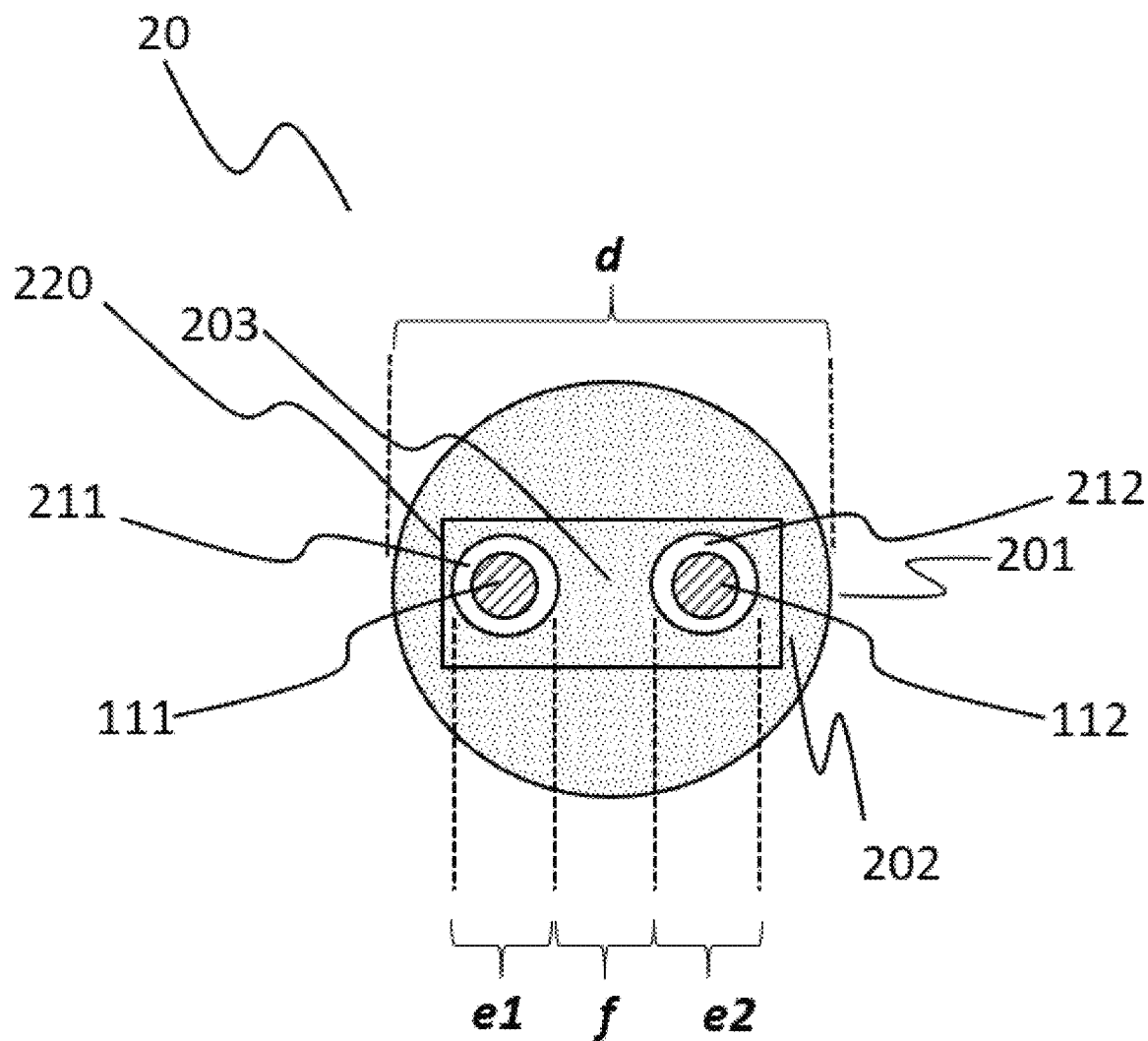

Referring now to FIGS. 11A-11D which show representative cross-sectional schematic drawings of disclosed preforms. FIG. 11A shows a preform 20 is shown as a cross-sectional plane along the longitudinal or long axis of a disclosed preform, i.e., along the length of a preform, showing a preform outside edge 201 demarking an outside surface. The preform 20 comprises a preform supporting material 202 surrounding a preform electrode assembly comprising a first electrode 211 and a second electrode 222, with an inter-electrode material 203 therein surrounding the first electrode 211 and the second electrode 222. The preform is associated with a cross-sectional width d, and each of the first electrode 111 and the second electrode 122 arranged within a first channel 211 and a second channel 212, wherein each of the channels associated with an channel cross-sectional width, e1 and e2, respectively. The first electrode 211 and the second electrode 222 spaced from one another by an inter-electrode distance f. In this figure, the supporting material and the inter-electrode material comprise essentially the same material or mixture of materials.

Figure 11C:
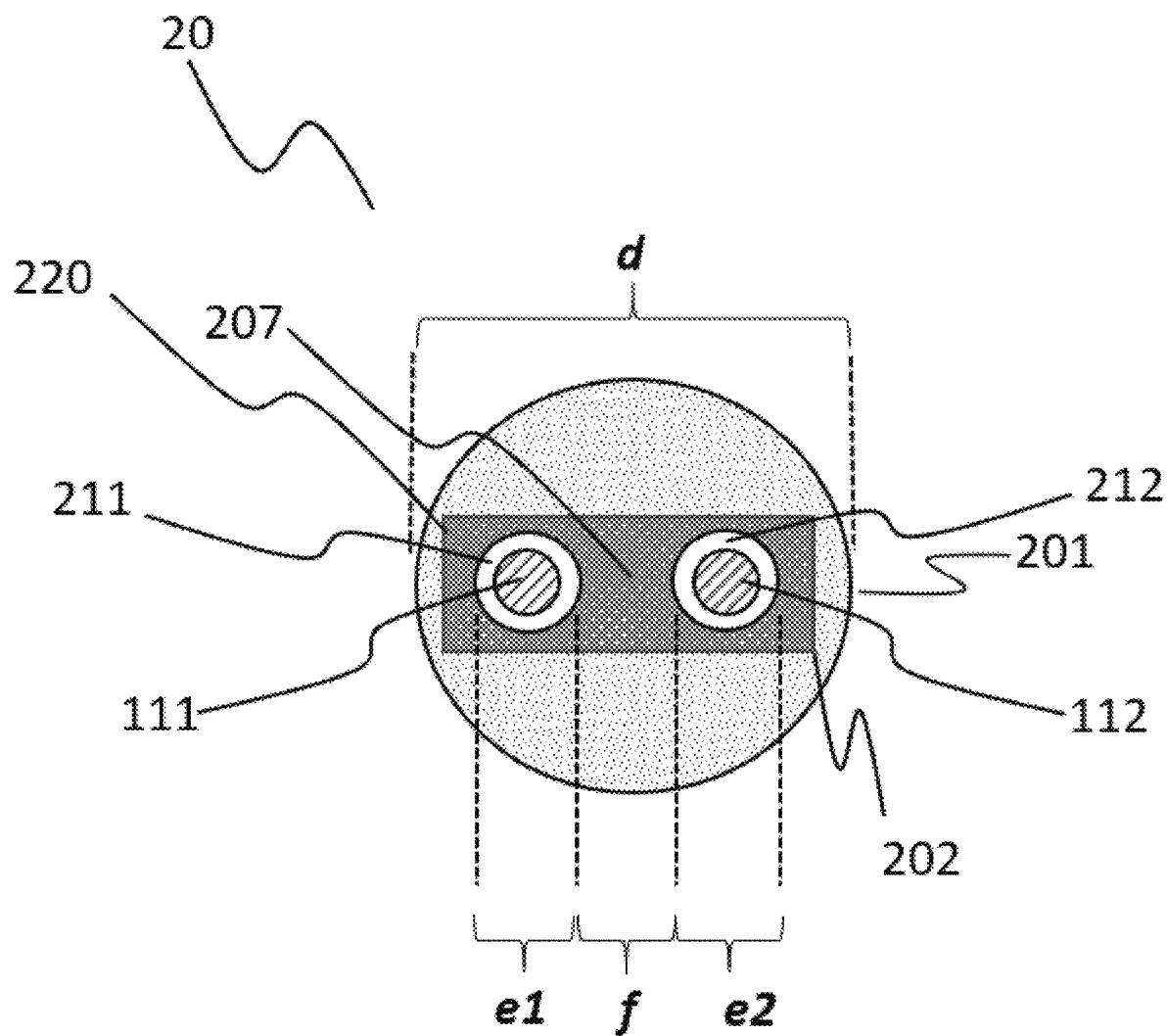
Figure 11D:
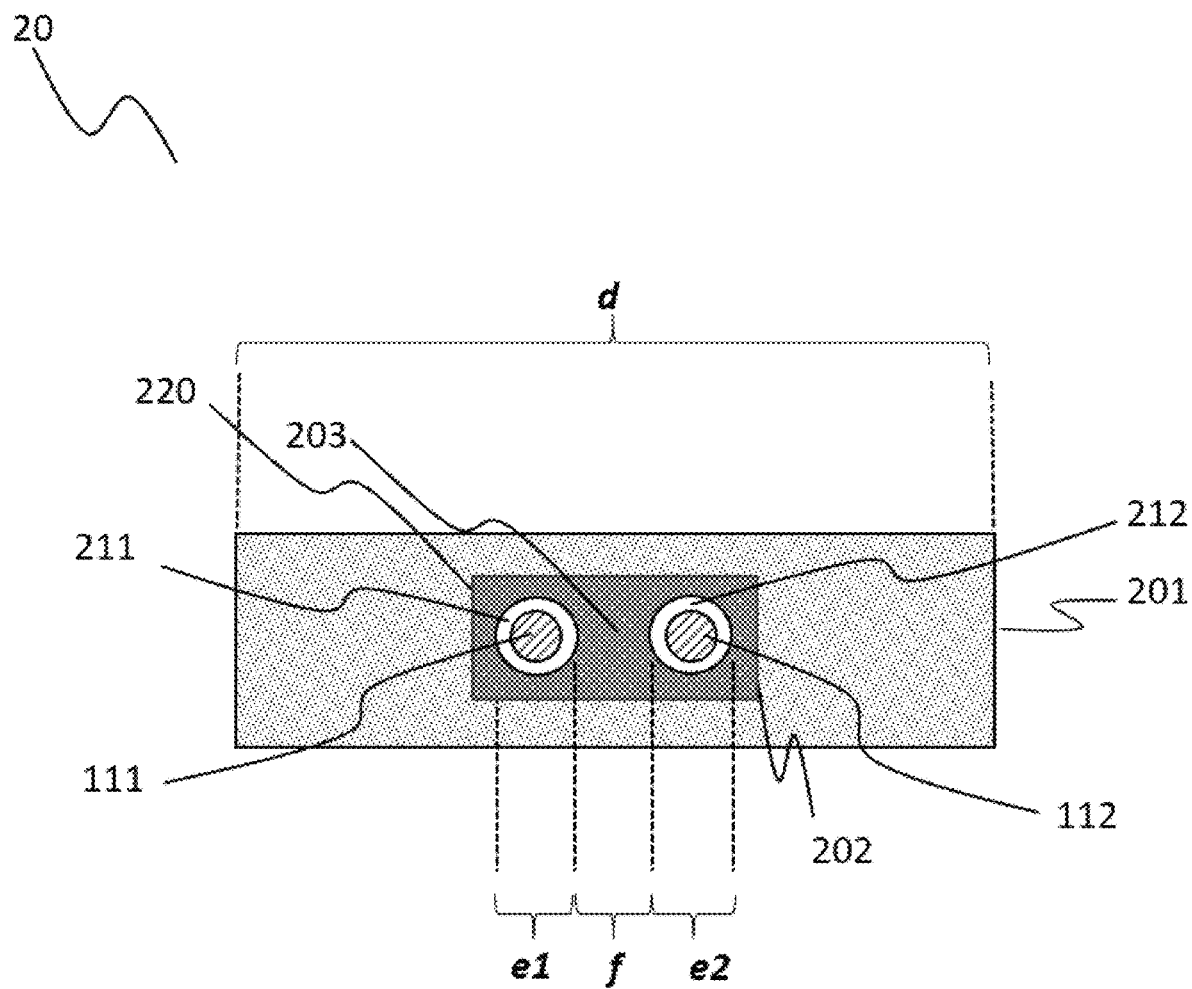

FIG. 11B shows a cross-section view along an axis perpendicular to the longitudinal or long axis of a disclosed preform in which the cross-sectional geometry of the preform is circular, and the supporting material and inter-electrode material comprise the same material. In this figure, the supporting material and the inter-electrode material comprise essentially the same material or mixture of materials. The preform electrode assembly shown in this figure has a rectangular cross-sectional geometry, but it is understood that other cross-sectional geometries are contemplated by the present disclosure as described herein above. In this drawing the preform channels, the first channel 211 and a second channel 212, and the electrodes, the first electrode 111 and the second electrode 122, each have a circular cross-sectional geometry, but it is understood that other cross-sectional geometries are contemplated by the present disclosure as described herein above for each of these. FIG. 11C shows a cross-section view along an axis perpendicular to the longitudinal or long axis of a disclosed preform in which the cross-sectional geometry of the preform is circular, and the supporting material and inter-electrode material comprise the different materials. In this figure, the supporting material and the inter-electrode material comprise essentially different materials or mixture of materials. The preform electrode assembly shown in this figure has a rectangular cross-sectional geometry, but it is understood that other cross-sectional geometries are contemplated by the present disclosure as described herein above. FIG. 11D shows a cross-section view along an axis perpendicular to the longitudinal or long axis of a disclosed preform in which the cross-sectional geometry of the preform is rectangular, and the supporting material and inter-electrode material comprise the different materials. In this figure, the supporting material and the inter-electrode material comprise essentially different materials or mixture of materials. The preform electrode assembly shown in this figure has a rectangular cross-sectional geometry, but it is understood that other cross-sectional geometries are contemplated by the present disclosure as described herein above.

D. Devices

In various aspects, the present disclosure pertains to devices for distributed sensing comprising: a fiber of claim 1 configured to connect to a device for measuring impedance variation. That is, the fiber comprises at least two electrodes embedded in a supporting material that has dielectric properties. The supporting material can be deformable under various stimuli changes such as pressure, temperature, magnetic field, piezoelectric, and/or chemical or liquid environment changes in which the inter-electrode distance and/or dielectric properties of the inter-electrode material change in response to the stimuli, thereby changing impedance at the site of stimuli change. Although pressure and temperature are specifically highlighted, other stimuli that can effect a change in impedance, e.g., by modifying or altering the distance separating the electrodes, can be readily measure using the disclosed fibers in the disclosed devices. That is, the embedded electrodes inside the fibers form a parallel wire transmission line, and the local characteristic impedance is designed to change with the temperature or pressure. The electrical frequency domain reflectometry is used to interrogate the impedance change along the fiber and provides information with high spatial resolution.

The devices can utilize fibers as disclosed herein comprising at least two electrodes, e.g., two, three, four, five, six, seven, eight or more electrodes arranged parallel to one another in the fiber. It is to be understood that in a fiber have two electrodes, one electrode is a first electrode and the other electrode is a second electrode. Similar, a fiber having three electrodes would be understood to comprise a first electrode, a second electrode, and a third electrode for reference purposes and so on for fibers comprising four, five, six, etc. electrodes. Depending upon the interrogation scheme used, different pairings of three or more electrodes can be configured to sense different changes along the fiber. For example, a fiber comprising three electrodes, i.e., a first electrode, a second electrode, and a third electrode, can be configured such that changes in impedance between the first electrode and the second electrode can be designed and configured to detect changes in pressure, whereas the second electrode and third electrode can be designed and configured to detect changes in temperature.

In a further aspect, the device for measuring impedance variation is an electrical reflectometry device. In some instances, the electrical reflectometry device is a time domain reflectometry device. Alternatively, the electrical reflectometry device is a frequency domain reflectometry device, e.g., such as a vector network analyzer.

As mentioned above, the disclosed device can be configured to determine a change in pressure along the fiber at one or more locations or index positions along the fiber. In some instances, the device can be configured measures a change in pressure at multiple points along the fiber, either a linear position along a fiber or a 2D position for a fiber arranged in a suitable grid as discussed in the Examples. In a still further aspect, the device is configured to measure a change in pressure from about 0.1 kPa to about 20 kPa; about 1 kPa to about 20 kPa; about 2.5 kPa to about 10 kPa; or a range within any of the foregoing ranges; or a value or set of values within any of the foregoing ranges. In a yet further aspect, the device is configured to measure a change in temperature from about 0.1° C. to about 10° C.; about 0.1° C. to about 5° C.; about 0.5° C. to about 2.5° C.; or a range within any of the foregoing ranges; or a value or set of values within any of the foregoing ranges.

E. Articles

The present disclosure further relates to articles comprising a disclosed fiber. The article can comprise a disclosed fiber in various contexts, e.g., a disclosed fiber can be woven or knit into an article that is a fabric. In some instances, the fiber can be co-knit or co-woven with one or more other yarns or filaments into a fabric. In a still further aspect, the article is a yarn or filament. In other instances, the fiber can be used as a component in a composite fiber, yarn or filament comprising conventional textile fibers, yarns, or filaments. In a yet further aspect, the fiber is a component of a fabric such as woven fabric, non-woven fabric, or knit fabric.

In a further aspect, an article can comprise a disclosed fiber in a manner in which the disclosed fiber is adhered or attached to a surface of the article, e.g., glued, mounted, laid in a channeled, and the like on a surface, e.g., a surface such as a film, sheet, layer, fabric surface, and the like.

In a further aspect, the article is a bandage, a wound dressing, a medical device, or an article of clothing. In a still further aspect, the article of clothing is a pair of pants, a shirt, a jacket, a dress, an article of intimate apparel, or a skirt. In a yet further aspect, the article is an article of sportswear. In an even further aspect, the article is an article of drapery, an article of furniture, a component of a security device, and the like.

F. Aspects

The following listing of exemplary aspects supports and is supported by the disclosure provided herein.

Aspect 1. A fiber comprising: a supporting material surrounding an electrode assembly comprising an inter-electrode material surrounding at least two electrodes; wherein the at least two electrodes are separated by an inter-electrode distance; wherein the at least two electrodes are arranged parallel to one another; and wherein the at least two electrodes are parallel to an outer surface of the fiber.

Aspect 2. The fiber of Aspect 1, wherein the supporting material and inter-electrode material are essentially the same material.

Aspect 3. The fiber of Aspect 1, wherein the supporting material and inter-electrode material are essentially not the same material.

Aspect 4. The fiber of any one of Aspects 1-Aspect 3, wherein the at least two electrodes are two electrodes.

Aspect 5. The fiber of any one of Aspects 1-Aspect 3, wherein the at least two electrodes are three electrodes.

Aspect 6. The fiber of any one of Aspects 1-Aspect 3, wherein the at least two electrodes are four electrodes.

Aspect 7. The fiber of any one of Aspects 1-Aspect 6, wherein the supporting material is a polymer, a ceramic material, a silica material, a glass material, or combinations thereof.

Aspect 8. The fiber of Aspect 7, wherein the polymer is a thermoplastic polymer.

Aspect 9. The fiber of Aspect 8, wherein the thermoplastic polymer is a polyester, a polyether, a polycarbonate, a polyolefin, a polyetherimide, a vinyl polymer, combinations thereof, or copolymers thereof.

Aspect 10. The fiber of Aspect 9, wherein the vinyl polymer is a polyacrylate, a polypropylene, a polyethylene, a polystyrene, a polybutylene, a polyacrylnitrile, a polyvinylacetate, a poly(methyl methacrylate), a polyisoprene, combinations thereof, or copolymers thereof.

Aspect 11. The fiber of Aspect 10, wherein the polyethylene is a low-density polyethylene.

Aspect 12. The fiber of Aspect 8, wherein the thermoplastic polymer is a polycarbonate.

Aspect 13. The fiber of Aspect 8, wherein the thermoplastic polymer is a thermoplastic elastomer.

Aspect 14. The fiber of Aspect 13, wherein the thermoplastic elastomer is a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

Aspect 15. The fiber of Aspect 7, wherein the supporting material is a ceramic material.

Aspect 16. The fiber of Aspect 7, wherein the supporting material is a silica material.

Aspect 17. The fiber of Aspect 1, wherein the supporting material has a Young's modulus of from about 10 KPa to about 100 GPa.

Aspect 18. The fiber of Aspect 17, wherein the supporting material has a Young's modulus of from about 1 MPa to about 10 GPa.

Aspect 19. The fiber of Aspect 17, wherein the supporting material has a Young's modulus of from about 1 MPa to about 1 GPa.

Aspect 20. The fiber of Aspect 17, wherein the supporting material has a Young's modulus of from about 0.1 MPa to about 5 MPa.

Aspect 21. The fiber of Aspect 17, wherein the supporting material has a Young's modulus of from about 0.5 MPa to about 2.5 MPa.

Aspect 22. The fiber of any one of Aspects 1-Aspect 21, wherein the inter-electrode material is a polymer, a ceramic material, a silica, or combinations thereof.

Aspect 23. The fiber of Aspect 22, wherein the polymer is a thermoplastic polymer.

Aspect 24. The fiber of Aspect 23, wherein the thermoplastic polymer is a polyester, a polyether, a polycarbonate, a polyolefin, a polyetherimide, a vinyl polymer, combinations thereof, or copolymers thereof.

Aspect 25. The fiber of Aspect 24, wherein the vinyl polymer is a polyacrylate, a polypropylene, a polyethylene, a polystyrene, a polybutylene, a polyacrylnitrile, a polyvinylacetate, a poly(methyl methacrylate), a polyisoprene, combinations thereof, or copolymers thereof.

Aspect 26. The fiber of Aspect 25, wherein the polyethylene is a low-density polyethylene.

Aspect 27. The fiber of Aspect 24, wherein the thermoplastic polymer is a polycarbonate.

Aspect 28. The fiber of Aspect 23, wherein the thermoplastic polymer is a thermoplastic elastomer.

Aspect 29. The fiber of Aspect 28, wherein the thermoplastic elastomer is a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

Aspect 30. The fiber of Aspect 22, wherein the inter-electrode material is a ceramic material.

Aspect 31. The fiber of Aspect 22, wherein the inter-electrode material is a silica material.

Aspect 32. The fiber of any one of Aspects 1-Aspect 31, wherein the inter-electrode material has a Young's modulus of from about 10 KPa to about 100 GPa.

Aspect 33. The fiber of Aspect 32, wherein the inter-electrode material has a Young's modulus of from about 1 MPa to about 10 GPa.

Aspect 34. The fiber of Aspect 32, wherein the inter-electrode material has a Young's modulus of from about 1 MPa to about 1 GPa.

Aspect 35. The fiber of Aspect 32, wherein the inter-electrode material has a Young's modulus of from about 0.1 MPa to about 5 MPa.

Aspect 36. The fiber of Aspect 32, wherein the inter-electrode material has a Young's modulus of from about 0.5 MPa to about 2.5 MPa.

Aspect 37. The fiber of any one of Aspects 1-Aspect 36, wherein each of the at least two electrodes comprises a material independently selected from copper, gold, aluminum, silver, tungsten, steel, combinations thereof, or alloys thereof.

Aspect 38. The fiber of Aspect 37, wherein each of the at least two electrodes comprises essentially the same material.

Aspect 39. The fiber of Aspect 1, wherein the fiber has cross-sectional width of from about 100 μm to about 2.5 mm.

Aspect 40. The fiber of Aspect 39, wherein the fiber has cross-sectional width of from about 200 μm to about 2 mm.

Aspect 41. The fiber of Aspect 39, wherein the fiber has cross-sectional width of from about 200 μm to about 1 mm.

Aspect 42. The fiber of any one of Aspects 1-Aspect 41, wherein each of the at least two electrodes has cross-sectional width of from about 10 μm to about 1 mm.

Aspect 43. The fiber of Aspect 42, wherein each of the at least two electrodes has cross-sectional width of from about 10 μm to about 500 μm.

Aspect 44. The fiber of Aspect 42, wherein each of the at least two electrodes has cross-sectional width of from about 25 μm to about 500 μm.

Aspect 45. The fiber of Aspect 42, wherein each of the at least two electrodes has cross-sectional width of from about 50 μm to about 500 μm.

Aspect 46. The fiber of Aspect 42, wherein each of the at least two electrodes has cross-sectional width of from about 100 μm to about 500 μm.

Aspect 47. The fiber of any one of Aspects 1-Aspect 46, wherein the inter-electrode space is from about 0.1 μm to about 1 mm.

Aspect 48. The fiber of Aspect 47, wherein the inter-electrode space is from about 1 μm to about 1 mm.

Aspect 49. The fiber of Aspect 47, wherein the inter-electrode space is from about 1 μm to about 750 μm.

Aspect 50. The fiber of Aspect 47, wherein the inter-electrode space is from about 10 μm to about 500 μm.

Aspect 51. The fiber of any one of Aspects 1-Aspect 50, wherein the fiber has a cross-sectional geometry that is circular, rectangular, square, triangular, or ovular.

Aspect 52. The fiber of Aspect 1, wherein the fiber has a pressure sensitivity from about 0.1 kPa to about 20 kPa determined using electrical reflectometry to interrogate impedance change along the fiber.

Aspect 53. The fiber of Aspect 52, wherein the fiber has a pressure sensitivity from about 1 kPa to about 20 kPa.

Aspect 54. The fiber of Aspect 52, wherein the fiber has a pressure sensitivity from about 2.5 kPa to about 10 kPa.

Aspect 55. The fiber of Aspect 52, wherein the electrical reflectometry is frequency domain reflectometry.

Aspect 56. The fiber of Aspect 52, wherein the electrical reflectometry is time domain reflectometry.

Aspect 57. The fiber of any one of Aspects 1-Aspect 56, wherein the fiber has a temperature sensitivity from about 0.1° C. to about 10° C. determined using electrical reflectometry to interrogate impedance change along the fiber.

Aspect 58. The fiber of Aspect 57, wherein the fiber has a temperature sensitivity from about 0.1° C. to about 5° C.

Aspect 59. The fiber of Aspect 57, wherein the fiber has a temperature sensitivity from about 0.5° C. to about 2.5° C.

Aspect 60. The fiber of Aspect 57, wherein the electrical reflectometry is frequency domain reflectometry.

Aspect 61. The fiber of Aspect 57, wherein the electrical reflectometry is time domain reflectometry.

Aspect 62. An article comprising the fiber of any one of Aspects 1-Aspect 61.

Aspect 63. The article of Aspect 62, wherein the article is a yarn.

Aspect 64. The article of Aspect 63, wherein the yarn is a component of a fabric.

Aspect 65. The article of Aspect 64, wherein the fabric is a woven fabric, non-woven fabric, or knit fabric.

Aspect 66. The article of Aspect 62, wherein the article is a fabric, a bandage, a wound dressing, a medical device, or an article of clothing.

Aspect 67. The article of Aspect 66, wherein the article of clothing is a pair of pants, a shirt, a jacket, a dress, an article of intimate apparel, or a skirt.

Aspect 68. The article of Aspect 62, wherein the article is an article of sportswear.

Aspect 69. The article of Aspect 62, wherein is the article is an article of drapery.

Aspect 70. The article of Aspect 62, wherein is the article is a floor covering.

Aspect 71. A device for distributed sensing comprising: the fiber of any one of Aspects 1-Aspect 61 configured to connect to a device for measuring impedance variation.

Aspect 72. The device of Aspect 71, wherein the device for measuring impedance variation is an electrical reflectometry device.

Aspect 73. The device of Aspect 72, wherein the electrical reflectometry device is a time domain reflectometry device.

Aspect 74. The device of Aspect 72, wherein the electrical reflectometry device is a frequency domain reflectometry device.

Aspect 75. The device of Aspect 74, wherein the frequency domain reflectometry device is a vector network analyzer.

Aspect 76. The device of any one of Aspects Aspect 71-Aspect 75, wherein the device determines change in pressure along the fiber.

Aspect 77. The device of Aspect 76, wherein the device measures a change in pressure at multiple points along the fiber.

Aspect 78. The device of Aspect 76, wherein the device measures a change in pressure from about 0.1 kPa to about 20 kPa.

Aspect 79. The device of Aspect 78, wherein the device measures a change in pressure from about 1 kPa to about 20 kPa.

Aspect 80. The device of Aspect 78, wherein the device measures a change in pressure from about 2.5 kPa to about 10 kPa.

Aspect 81. The device of any one of Aspects Aspect 71-Aspect 80, wherein the device determines change in temperature along the fiber.

Aspect 82. The device of Aspect 81, wherein the device measures a change in temperature at multiple points along the fiber.

Aspect 83. The device of Aspect 82, wherein the device measures a change in temperature from about 0.1° C. to about 10° C.

Aspect 84. The device of Aspect 82, wherein the device measures a change in temperature from about 0.1° C. to about 5° C.

Aspect 85. The device of Aspect 82, wherein the device measures a change in temperature from about 0.5° C. to about 2.5° C.

Aspect 86. A method of fabricating the fiber of any one of Aspects 1-Aspect 61, the method comprising: thermally drawing a preform comprising a supporting material surrounding a pre-form electrode assembly comprising an inter-electrode material surrounding at least two electrode channels; wherein each of the at least two electrode channels comprises an electrode; wherein the two channels are separated by an inter-electrode distance; wherein the two channels are arranged parallel to one another; and wherein the two channels are parallel to an outer surface of the preform.

Aspect 87. The method of Aspect 86, wherein the preform further comprises an outer layer comprising a material having a tensile modulus, a glass transition temperature, a melting temperature, a Young's modulus that is greater, respectively, than a tensile modulus, a glass transition temperature, a melting temperature, a Young's modulus of the supporting material.

Aspect 88. The method of Aspect 86 or Aspect 87, wherein the supporting material and inter-electrode material are essentially the same material.

Aspect 89. The method of Aspect 86 or Aspect 87, wherein the supporting material and inter-electrode material are essentially not the same material.

Aspect 90. The method of any one of Aspects Aspect 86-Aspect 89, wherein the at least two electrodes are two electrodes.

Aspect 91. The method of any one of Aspects Aspect 86-Aspect 89, wherein the at least two electrodes are three electrodes.

Aspect 92. The method of any one of Aspects Aspect 86-Aspect 89, wherein the at least two electrodes are four electrodes.

Aspect 93. The method of any one of Aspects Aspect 86-Aspect 92, wherein the supporting material is a polymer, a ceramic material, a silica, or combinations thereof.

Aspect 94. The method of Aspect 93, wherein the polymer is a thermoplastic polymer.

Aspect 95. The method of Aspect 94, wherein the thermoplastic polymer is a polyester, a polyether, a polycarbonate, a polyolefin, a polyetherimide, a vinyl polymer, combinations thereof, or copolymers thereof.

Aspect 96. The method of Aspect 95, wherein the vinyl polymer is a polyacrylate, a polypropylene, a polyethylene, a polystyrene, a polybutylene, a polyacrylnitrile, a polyvinylacetate, a poly(methyl methacrylate), a polyisoprene, combinations thereof, or copolymers thereof.

Aspect 97. The method of Aspect 96, wherein the polyethylene is a low-density polyethylene.

Aspect 98. The method of Aspect 94, wherein the thermoplastic polymer is a polycarbonate.

Aspect 99. The method of Aspect 94, wherein the thermoplastic polymer is a thermoplastic elastomer.

Aspect 100. The method of Aspect 99, wherein the thermoplastic elastomer is a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

Aspect 101. The method of Aspect 93, wherein the supporting material is a ceramic material.

Aspect 102. The method of Aspect 93, wherein the supporting material is a silica material.

Aspect 103. The method of any one of Aspects Aspect 86-Aspect 102, wherein the supporting material has a Young's modulus of from about 10 KPa to about 100 GPa.

Aspect 104. The method of Aspect 103, wherein the supporting material has a Young's modulus of from about 1 MPa to about 10 GPa.

Aspect 105. The method of Aspect 103, wherein the supporting material has a Young's modulus of from about 1 MPa to about 1 GPa.

Aspect 106. The method of Aspect 103, wherein the supporting material has a Young's modulus of from about 0.1 MPa to about 5 MPa.

Aspect 107. The method of Aspect 103, wherein the supporting material has a Young's modulus of from about 0.5 MPa to about 2.5 MPa.

Aspect 108. The method of any one of Aspects Aspect 86-Aspect 107, wherein the inter-electrode material is a polymer, a ceramic material, a silica, or combinations thereof.

Aspect 109. The method of Aspect 108, wherein the polymer is a thermoplastic polymer.

Aspect 110. The method of Aspect 109, wherein the thermoplastic polymer is a polyester, a polyether, a polycarbonate, a polyolefin, a polyetherimide, a vinyl polymer, combinations thereof, or copolymers thereof.

Aspect 111. The method of Aspect 110, wherein the vinyl polymer is a polyacrylate, a polypropylene, a polyethylene, a polystyrene, a polybutylene, a polyacrylnitrile, a polyvinylacetate, a poly(methyl methacrylate), a polyisoprene, combinations thereof, or copolymers thereof.

Aspect 112. The method of Aspect 111, wherein the polyethylene is a low-density polyethylene.

Aspect 113. The method of Aspect 109, wherein the thermoplastic polymer is a polycarbonate.

Aspect 114. The method of Aspect 109, wherein the thermoplastic polymer is a thermoplastic elastomer.

Aspect 115. The method of Aspect 114, wherein the thermoplastic elastomer is a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

Aspect 116. The method of Aspect 108, wherein the inter-electrode material is a ceramic material.

Aspect 117. The method of Aspect 108, wherein the inter-electrode material is a silica material.

Aspect 118. The method of any one of Aspects Aspect 86-Aspect 117, wherein the inter-electrode material has a Young's modulus of from about 10 KPa to about 100 GPa.

Aspect 119. The method of Aspect 118, wherein the inter-electrode material has a Young's modulus of from about 1 MPa to about 10 GPa.

Aspect 120. The method of Aspect 118, wherein the inter-electrode material has a Young's modulus of from about 1 MPa to about 1 GPa.

Aspect 121. The method of Aspect 118, wherein the inter-electrode material has a Young's modulus of from about 0.1 MPa to about 5 MPa.

Aspect 122. The method of Aspect 118, wherein the inter-electrode material has a Young's modulus of from about 0.5 MPa to about 2.5 MPa.

Aspect 123. The method of any one of Aspects Aspect 86-Aspect 122, wherein each of the at least two electrodes comprises a material independently selected from copper, gold, aluminum, silver, or combinations thereof.

Aspect 124. The method of Aspect 123, wherein each of the at least two electrodes comprises essentially the same material.

Aspect 125. The method of any one of Aspects Aspect 86-Aspect 124, wherein the fiber has cross-sectional width of from about 100 µm to about 2.5 mm.

Aspect 126. The method of Aspect 125, wherein the fiber has cross-sectional width of from about 200 µm to about 2 mm.

Aspect 127. The method of Aspect 125, wherein the fiber has cross-sectional width of from about 200 µm to about 1 mm.

Aspect 128. The method of any one of Aspects Aspect 86-Aspect 127, wherein each of the at least two electrodes has cross-sectional width of from about 10 µm to about 1 mm.

Aspect 129. The method of Aspect 128, wherein each of the at least two electrodes has cross-sectional width of from about 10 µm to about 500 µm.

Aspect 130. The method of Aspect 128, wherein each of the at least two electrodes has cross-sectional width of from about 25 µm to about 500 µm.

Aspect 131. The method of Aspect 128, wherein each of the at least two electrodes has cross-sectional width of from about 50 µm to about 500 µm.

Aspect 132. The method of Aspect 128, wherein each of the at least two electrodes has cross-sectional width of from about 100 µm to about 500 µm.

Aspect 133. The method of any one of Aspects Aspect 86-Aspect 132, wherein the inter-electrode space is from about 0.1 µm to about 1 mm.

Aspect 134. The method of Aspect 133, wherein the inter-electrode space is from about 1 µm to about 1 mm.

Aspect 135. The method of Aspect 133, wherein the inter-electrode space is from about 1 µm to about 750 µm.

Aspect 136. The method of Aspect 133, wherein the inter-electrode space is from about 10 µm to about 500 µm.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

G. Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Multi-Material Fiber Fabrication and Sensing Principles

Thermal drawing is a powerful method to fabricate multi-material fibers. First, a macroscopic preform resembles the final fiber geometry and composition is fabricated. The preform is then heated in a furnace for the thermal drawing. As temperature increases during the initial heating, the viscosity of the amorphous material decreases, and as the preform is heated beyond a glass transition temperature of the material it can be gradually drawn into fibers with a reduced cross-sectional dimension.

Identifying materials that can be drawn together is an important variable for successful thermal drawing, e.g., compatible drawing temperature. At the drawing temperature, the supporting amorphous materials should be able to continuously and controllably deform while supporting the other materials inside the preform. The co-drawing amorphous or semi-crystalline material should become viscous at the drawing temperature, and crystalline material such as metal should have a melting temperature below the draw temperature. Small size devices like photodiode and high-melting-temperature metal electrodes whose size is not changed during the drawing can also be co-drawn with special care.

Electrodes can be embedded in fibers as electrical probes or provide electrical connections to the devices inside the fiber. When the electrical signal frequency is below the radio frequency, the electrodes are characterized by their DC resistance. The use of conductive polymers such as carbon-doped polyethylene (CPE) or low-melting-temperature metal alloys is common. In both cases, the conductive material is embedded in the preform surrounded by amorphous materials. As the amorphous materials soften in the furnace, the conductive material will either soften (for polymer) or become molten (for metal and alloy). Its size reduces with the bulk preform, and the material gradually turns into a thin electrode inside the fibers during drawing. For the electrode-embedded fibers disclosed herein, it can be desirable that a low impedance material be used to help ensure the transmission of high-frequency signal with acceptable transmission loss. Copper electrodes were selected for this project, and a convergence drawing method was used. Copper electrode thin wires are passed through the hollow channels of the preform. When the softened preform is being drawn into the fiber, the size of channel size decreases and converges on the metal wires. This method provides a way to embed high-melting-temperature metal electrodes into the fiber to provide a low-impedance connection. It also poses little constraint on the selection of electrode materials.

Figure 6:
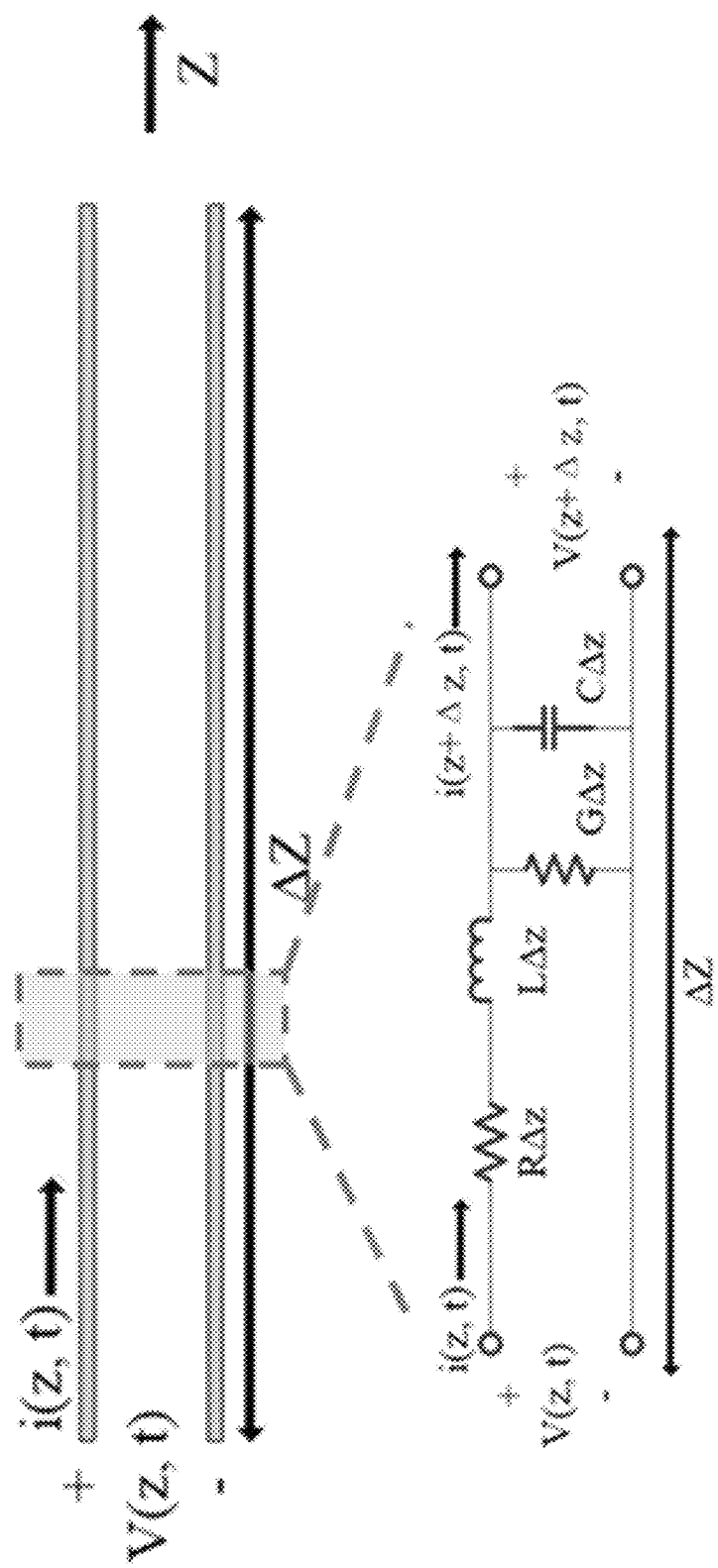
FIG. 6 shows a representative schematic drawing of a parallel line model for a disclosed two-electrode fiber, also showing an equivalent circuit for a small segment of the fiber.

The polymer fibers with a pair of electrodes can be modeled as a transmission line at high frequency, shown in FIG. 6. The fiber can be viewed as a cascade of infinitesimal segments, and each segment is a lumped-element circuit. The equivalent circuit has four parameters R, L, G, and C, representing the resistance, inductance, conductance, and capacitance per unit length. When the electrode diameter is d, and the distance between the electrodes is D, the characteristic impedance of the transmission line can be calculated from the material and geometric parameters shown in Equation 1.

$$Z_0 = \sqrt{R + j\omega L / G + j\omega C} \approx \sqrt{\frac{L}{C}} = \frac{1}{\pi}\sqrt{\frac{\mu}{\varepsilon}} \cdot \operatorname{acos}(D/d) \tag{1}$$

where $\mu$ and $\varepsilon$ are permeability and permittivity of the medium around the electrodes. The permeability of the material and the electrode diameter is usually a constant. If the fiber is uniform along its length, the impedance at each point remains the same, and no reflection will occur if an electrical pulse is excited in the fiber. A sudden change of impedance will result the incident pulse being partial reflected and the reflection coefficient is as given in Equation 2:

$$\rho = \frac{Z_1 - Z_0}{Z_1 + Z_0} \tag{2}$$

where $Z_1$ and $Z_0$ are the impedance in the perturbed section and the one for the rest of the fiber. The location of the reflection $z_i$ and the delay time $t_i$ follow Equation 3:

$$t_i = 2z_i\sqrt{\varepsilon}/c = 2z_i/(VF \cdot c) \tag{3}$$

where VF is the velocity factor of the transmission line, c is the light speed in vacuum. The distance between the electrodes and the permittivity of the material around the electrodes can change with temperature or pressure. When the distance between the at least two electrodes increases or the dielectric material's permittivity decreases, the local impedance will increase, leading to a positive reflection. A negative reflection occurs when the distance decreases or the permittivity increases. The time domain reflectometry and the frequency domain reflectometry are commonly used to detect the impedance variation along a continuous transmission line, shown in FIG. 1A.

2. Pressure Sensing Fiber

For a disclosed multi-material electrode-embedded fiber, a hollow deformable structure can detect pressure by deformation. However, for a more robust design, the fibers disclosed herein use a solid structure with a soft material between the electrodes was used so that the distance between the electrodes decreases with pressure. Common thermoplastics such as PMMA, Polystyrene (PS) and Polycarbonate (PC) have Young's modulus greater than 1 GPa, therefore the deformation from compression is less than 0.1% when the pressure is less 1 MPa. Elastomers have lower Young's modulus, but they are usually thermosetting polymers that don't soften by heating after initial curing. Thermoplastic elastomers (TPEs) combine the advantages of both types of materials. They have low Young's modulus and at the same time can be processed repeatedly. The TPEs used in this work are Versaflex CL2242 and CL2250 from PolyOne. They are SEBS (styrene and ethylene/butylene) TPEs and have a 100% tensile stress of 1.05 MPa and 1.52 MPa. The TPEs were provided in the form of 1 mm thickness sheets and were subsequently pressed into the desired shape in vacuum at 180° C.

Figure 2A:
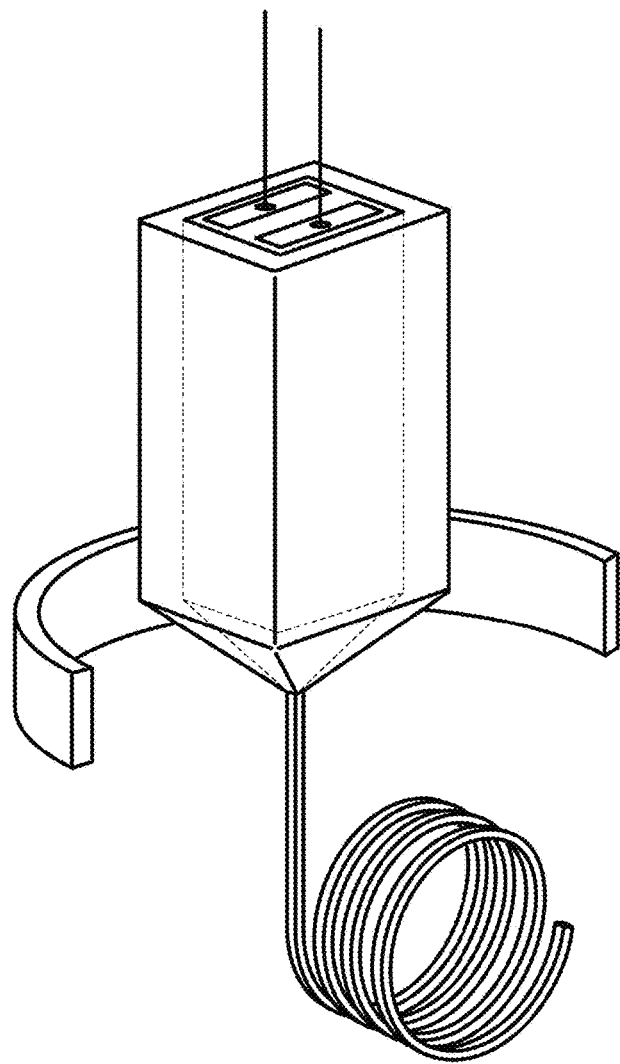
FIGS. 2A-2D show representative aspects of fabrication of a disclosed electrode-embedded fiber using a disclosed convergence thermal drawing method.

The TPEs blocks were first drawn directly, and the preforms broke during the initial heating period. When the TPE's viscosity decreases in the furnace, the tensile strength also decreases, and the preform cannot deform in a controllable manner. Therefore a thermoplastic PC cladding was added to ensure continuously drawing. Without wishing to be bound by a particular theory, it is believed that the PC can act as a shell to help TPE maintain its geometry during the thermal drawing and increase the overall tensile strength. The hard polymer cladding would prevent the TPE inside the fiber from deformation under pressure; thus, the PC cladding was etched away after the drawing with Dichloromethane (DCM). To prevent the organic solvent from damaging the TPE, a thin layer of Polyvinylidene Fluoride (PVDF) was added between the TPE and the PC layer. The TPE softens at 220° C. while PC and PVDF can be drawn at a temperature above 270° C. The design of the preform and the drawing process is shown in FIG. 2A.

Figure 2B:
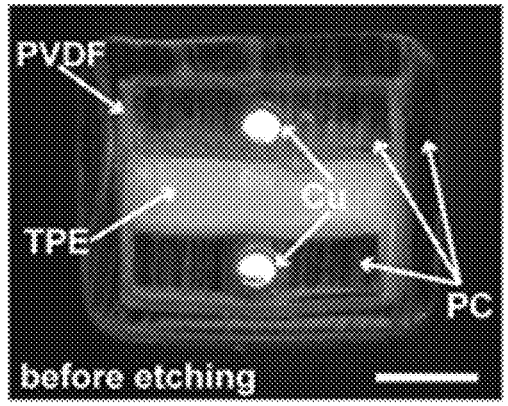
Figure 2C:
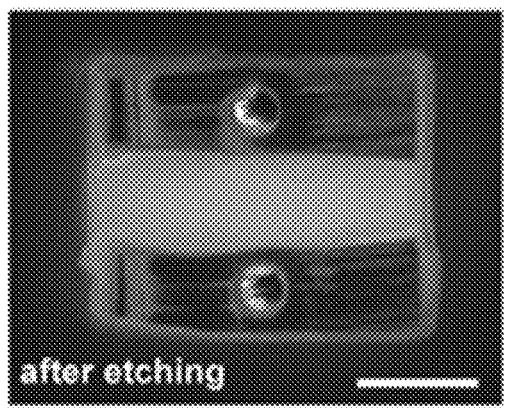
Figure 2D:
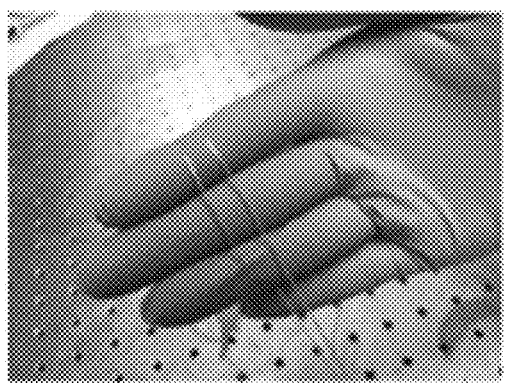

The preform fabrication procedure was as described in the following. Briefly, a layer of TPE is placed between four PC plates and then is consolidated in a vacuum oven for 30 minutes. Each of the PC plates has a semicircular groove on the surface, leading to two hollow channels after consolidation. The outer two layers are formed by polymer films. PVDF films are tightly wrapped to the core preform followed by PC films. The assembly is then placed in a heated vacuum oven and pressed into a solid preform. Before the drawing, the two wires are passed through the channel. The electrodes are confined in the hard PC layers once the fiber is drawn to the final diameter. Image of the drawn fiber, before and after DCM etching are shown in FIGS. 2B and 2C. We have also used PMMA and low-density polyethylene (LDPE) as the cladding and etch-stop materials and drawn similar fibers. Fiber with various sizes and selected copper electrodes diameters (125 µm, 80 µm, and 50 µm) were fabricated. The smallest fiber we have achieved has a size of 300 µm with two 50 µm electrodes.

The drawn fiber was subsequently connected to a vector network analyzer (VNA 8753D, HP) for distributed pressure measurement tests. The VNA requires 50Ω matching impedance, and the fiber impedance is between 150 and 200Ω depending on the design of each fiber. Therefore, an RF transformer was connected between the 50Ω coaxial cable and the fiber under test to minimize back reflection. The end of the fiber was also terminated with a variable resistor to reduce reflection. For each measurement, the VNA performed a frequency scan from 3 MHz to 4803 MHz for the frequency domain reflectometry, and the reflection parameter S11 was monitored at each frequency step. After transforming the data into time domain reflection information, impedance variation was extracted by comparing the reflection coefficient with the reference. The location of each impedance change was determined by tracking the time stamp corresponding to the change, as given by Equation 3.

Figure 3B:
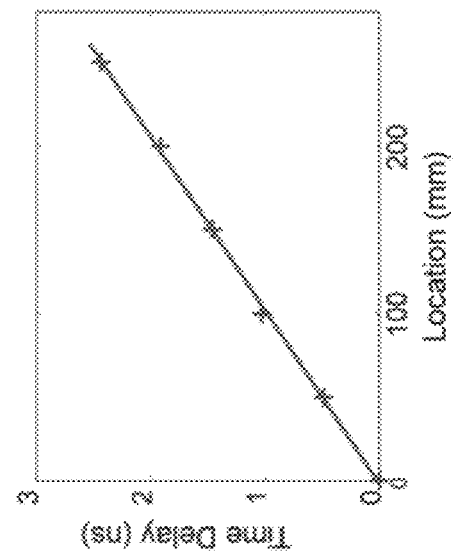
FIGS. 3A-3E show a representative schematic drawing and data pertaining to a representative measurement of a disclosed pressure sensing fiber.
Figure 3C:
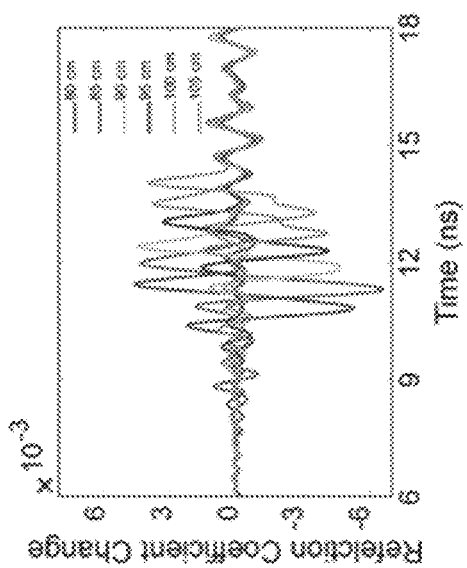
Figure 3A:
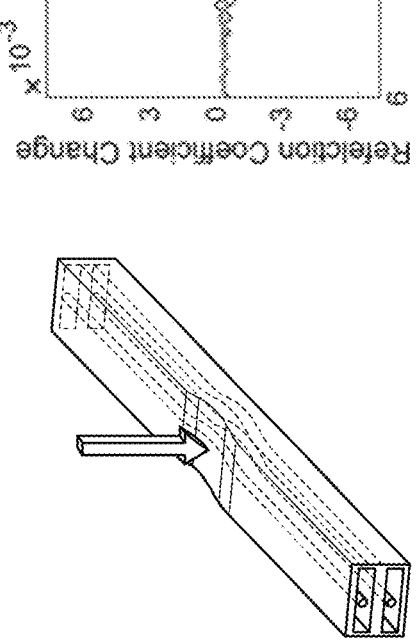

Pressure was first applied to the fiber by hand, shown in FIG. 3A. The first press location was 80 cm from the start of the fiber, and the distance between each press point was 5 cm. The results in FIG. 3B show a series of negative-positive peak pairs corresponding to the finger press. As discussed in the previous section, when a section of the fiber is under pressure, the impedance of the section is reduced. When the detection signal encounters the drop of impedance, a negative reflection occurs, and when the impedance resumes to normal, a positive reflection follows. The peaks are equally spaced in the time domain, and the time delay increment represents the additional time for the signal to travel 10 cm (roundtrip). By plotting a time delay vs. location figure shown in FIG. 3C, we can calculate that the velocity factor is 0.69, and the relative permittivity is 2.1.

Figure 3E:
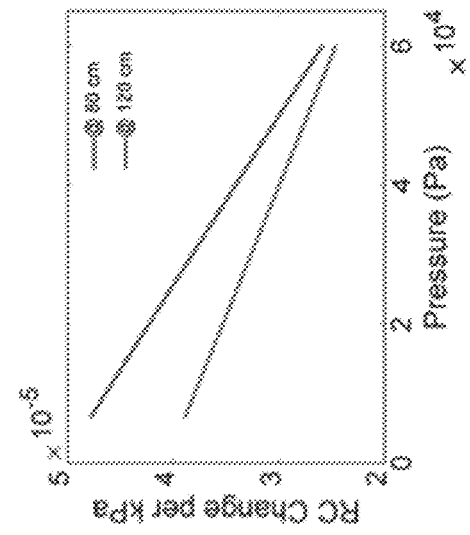
Figure 3D:
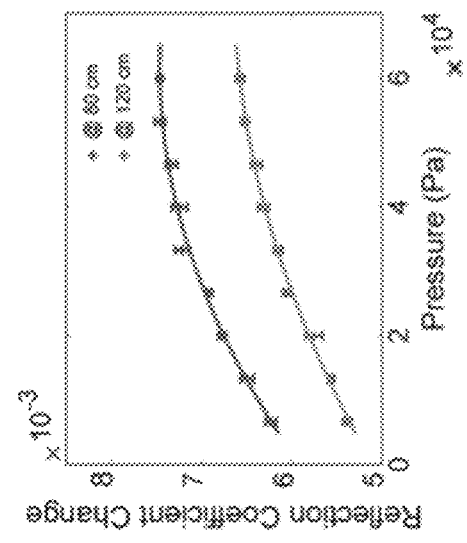

In order to quantify the pressure response of the disclosed fiber, a linear stage and a digital scale was used to apply repeatable pressure to the fiber. A 25 mm wide block was attached to the linear stage and the fiber was fixed on top of the scale. When the linear stage moved downwards, the block would come to contact with the fiber first and then pressed the fiber uniformly. The linear stage gave precise position control of the block, and the scale gave a reading in grams indicating the force applied to the fiber. By dividing the contact area, we can calculate the fiber response to pressure. Weights of 10 g to 90 g were used to apply force to the fiber, and the reflection data was taken five times. The range of the pressure applied was between 10 kPa and 60 kPa, and the result is shown in FIG. 3D. There is an initial change of the reflection coefficient that is likely coming from the contact of between the fiber and polymer block. It was further observed that the reflection change is smaller at 120 cm compared to that at 80 cm. This may be due to the transmission loss of the fiber and can be calibrated in signal post-processing. The pressure vs. reflection coefficient change is not a linear relationship. Alternatively, the reduction of the thickness of the polymer and the pressure does not follow a linear relationship. The larger the deformation is, the more pressure is required to compress the polymer further. In other aspects, the thickness of the TPE layer (or the distance between the electrodes) and the impedance can be characterized by Equation 1, which is also not a linear relationship. $2^{nd}$ order polynomials were used to curve fit the results shown in FIG. 3D, and the results are given here in Equation 4.

At 80 cm: $\Delta\rho = -4.10 \times 10^{-7} p^2 + 5.05 \times 10^{-5} p + 5.91 \times 10^{-3}$ At 120 cm: $\Delta\rho = -2.67 \times 10^{-7} p^2 + 4.07 \times 10^{-5} p + 5.10 \times 10^{-3}$ (4)

where $\Delta\rho$ is the change of reflection coefficient and p is the applied pressure in kPa. The nonlinear pressure response of the fiber can be calculated from the equation by taking the derivate of the reflection coefficient change. The result is shown in FIG. 3E. From the figure, we know that the lowest pressure response is $2.5 \times 10^{-5}$ kPa$^{-1}$. If we assume that a change of reflection coefficient of $10^{-4}$ can be differentiated, we can make a very conservative estimate that the pressure resolution is about 4 kPa. The pressure sensitivity presented here assumes that the fiber is not under pre-existing lateral compression. Increasing the averaging time and improving the interrogation system can further increase the resolution.

Figure 4B:
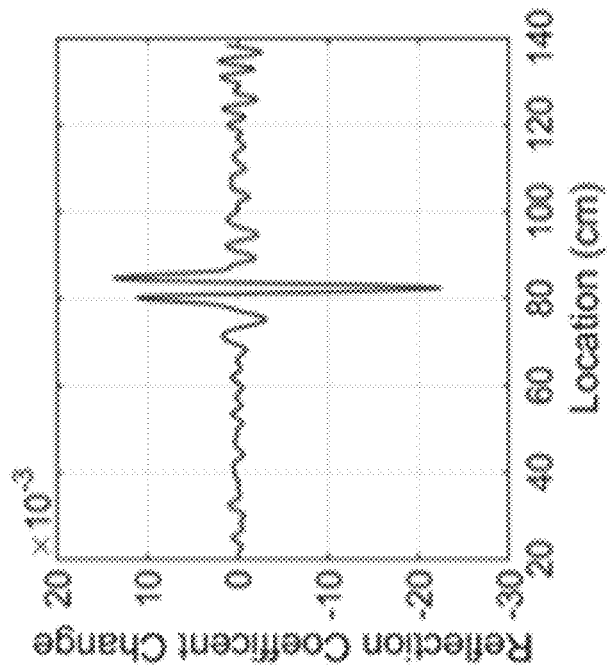
FIGS. 4A-4F show representative 2D grids comprising with a disclosed pressure sensing fiber in a 2D grid with finger stimulation, data obtained with same, and reconstructured pressure maps obtained from the finger stimulation of same.
Figure 4A:
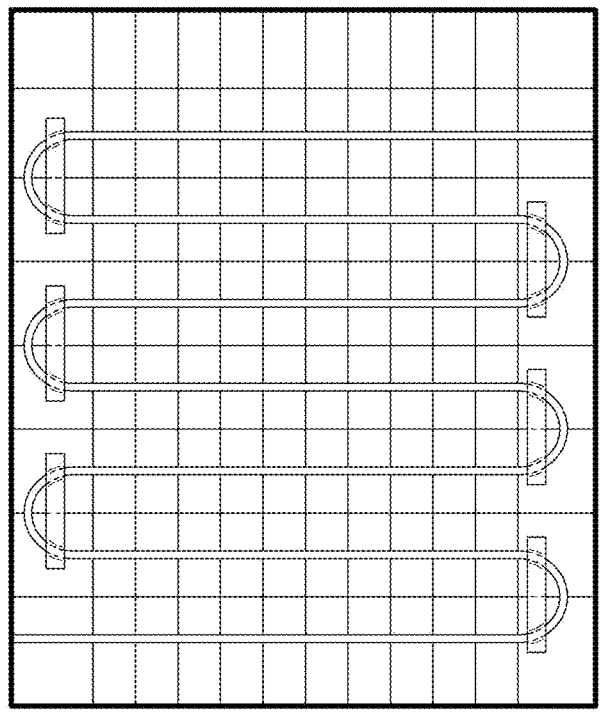
Figure 4D:
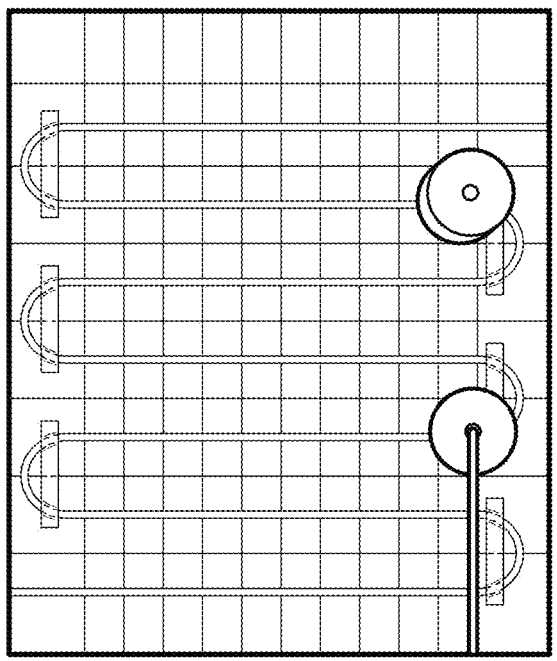
Figure 4C:
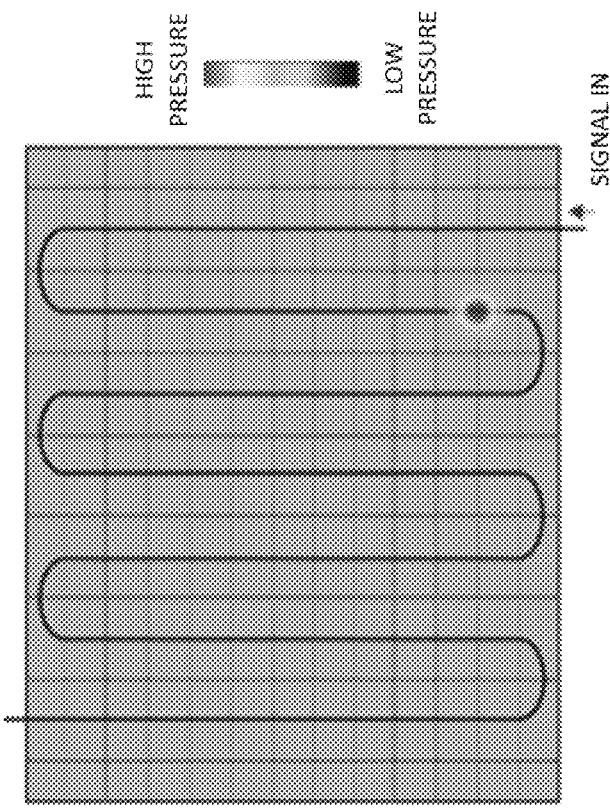
Figure 4E:
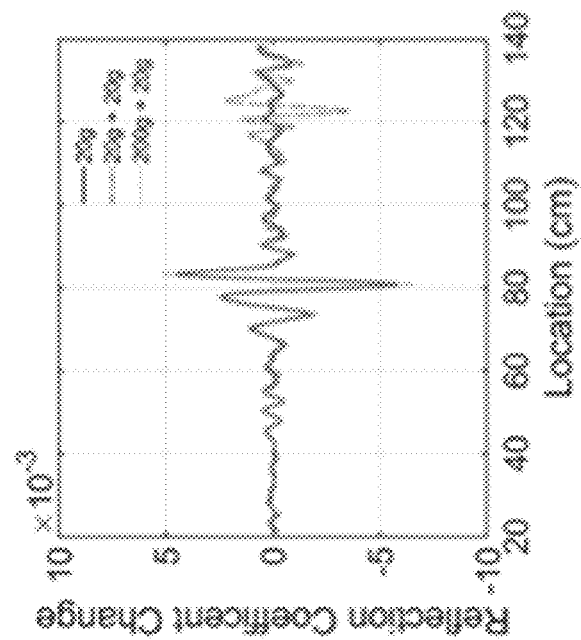
Figure 4F:
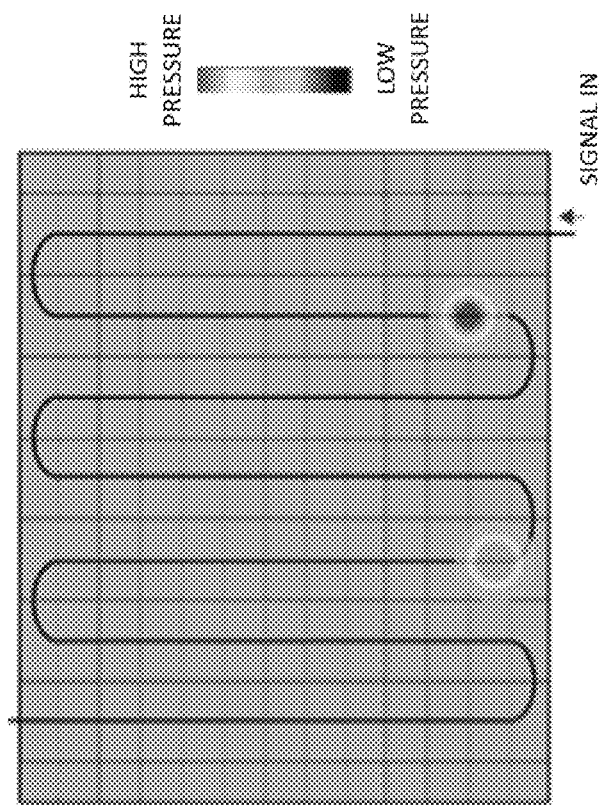

Also demonstrated herein is incorporating a disclosed fiber into a grid structure for 2D measurement. A continuous functional fiber (lighter colored, vertical) and segments of non-functional fibers were braided into a 17 cm by 17 cm grid shown in FIG. 4A. To demonstrate the 2D measurement capability, pressure was applied with a finger at a point 80 cm from the connection to the VNA, as shown in FIG. 4A. The output data from this stimulation is shown in FIG. 4B where there is clearly a large change in reflection coefficient at the expected location. FIG. 4C was reconstructed using this data, demonstrating that the location of the 2D stimulus can be identified. In order to demonstrate the grid's ability to sense multiple points and variable amounts of pressure applied, we placed two weights on the grid at locations corresponding to 80 cm and 120 cm, as seen in FIG. 4D. The output responses from the VNA can be seen in FIG. 4E. The blue trace is the response when only a single 20 g weight is applied at 80 cm. When the second 20 g weight is added at 120 cm, the dashed signal in orange now contains a peak at 120 cm. Finally, 180 g is added to the 80 cm point to produce the yellow dotted trace, causing an increase in amplitude of the first peak, while second peak at 120 cm remains constant. The data of the yellow trace was used to reconstruct FIG. 4F.

The spatial resolution of the system is determined by the VNA frequency scanning parameters. A 4.8 GHz scanning range would give a spatial resolution of 2.2 cm for the fiber with a 0.69 velocity factor. A larger scanning range would further improve the spatial resolution. The response time of the system is mainly limited by the frequency scanning and data processing speed of the equipment. For VNA HP 8753D, the time required is a few seconds depending on the frequency scanning range and the frequency step. To achieve a faster response, we have repeated the measurement with a newer VNA R&S ZVA50. A fiber sample was connected to the VNA, and the frequency was swept from 10 MHz to 4.8 GHz in steps of 3 MHz. The resultant response time including measurement, processing, and display time was found to be 216 ms. A short video of fiber being tapped by a linear motor with a 432 ms period is included in this manuscript for demonstration.

3. Temperature Sensing Fiber

The electrode-embedded fiber can also be designed to detect temperature changes. Temperature can change both the thickness of the polymer materials between the electrodes, and the permittivity of the polymer. By selecting polymer materials responsive to temperature, we have designed and fabricated two fibers that can measure temperature change. Low-density polyethylene (LDPE) has a large thermal expansion coefficient between $1\text{-}5.1\times10^{-4\circ}$ $C.^{-1}$ [40] which leads to an increase of impedance upon heating. It has also been reported a negative temperature dependence of its permittivity, which would further increase the impedance. Therefore, the disclosed fiber was fabricated LDPE fibers with 125 μm copper electrodes from a square LDPE preform using the convergence drawing method. LDPE has a glass transition temperature lower than $-100°$ C. and a melting temperature of $105\text{-}115°$ C. The preform was drawn at $165°$ C. An illustration of the drawing process and the cross section of the fiber are shown in FIGS. 5A and 5B.

Similar to the pressure tests, we first attached two sections of the drawn fiber to two thermoelectric coolers (TECs) illustrated in FIG. 5C. The TECs operate by the Peltier effect and are used to heat or cool the fiber attached on the top. The fiber was connected to the VNA, and the same frequency scanning method was used to acquire the reflection signal. After a reference signal was collected, the fiber was heated by the TECs, and two positive-negative peak pairs were observed. The impedance of the heated section is larger than the adjacent sections, so the front discontinuity led to a positive reflection while the rear discontinuity led to a negative one. While keeping the second fiber section heated, we switched the polarity of the first TEC to cool the first section of the fiber. A reversed negative-positive peak pair was observed, indicating that the section has a lower impedance. Both results are shown in FIG. 5D. We then heated a 5 cm segment of the fiber in a furnace from room temperature to $85°$ C. The peak amplitude increased with the temperature and the sensitivity calculated from tracking the positive peak is $9.8\times10^{-5\circ}$ $C.^{-1}$, as shown in FIGS. 5E and 5F. To estimate the smallest temperature the system can distinguish, the maximum standard deviation was calculated from the measured result to be $1.86\times10^{-4}$, which corresponds to $2°$ C.

Figure 8A:
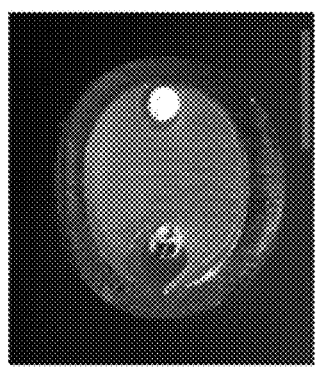
FIGS. 8A-8C show a representative image of a disclosed temperature sensing fiber comprising PVDF fiber with PC cladding and temperature data obtained using same.
Figure 8C:
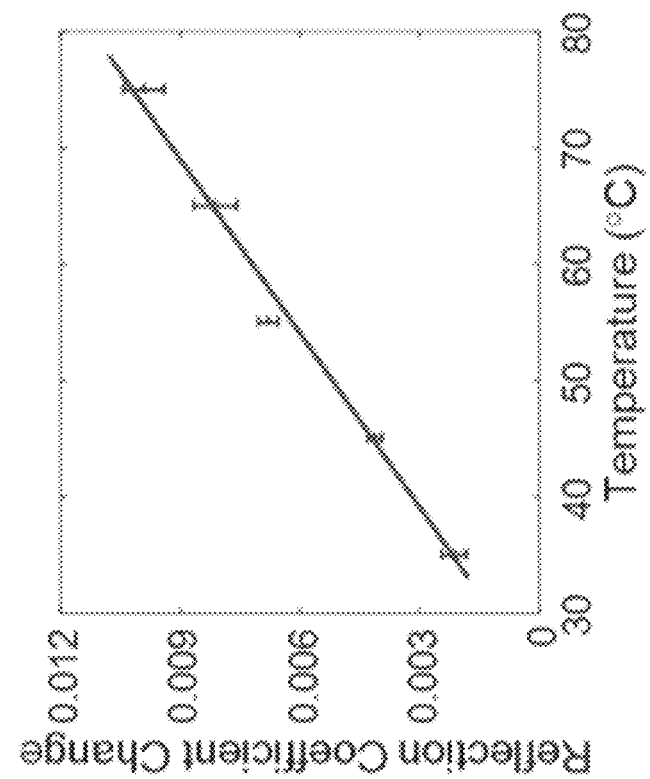
Figure 8B:
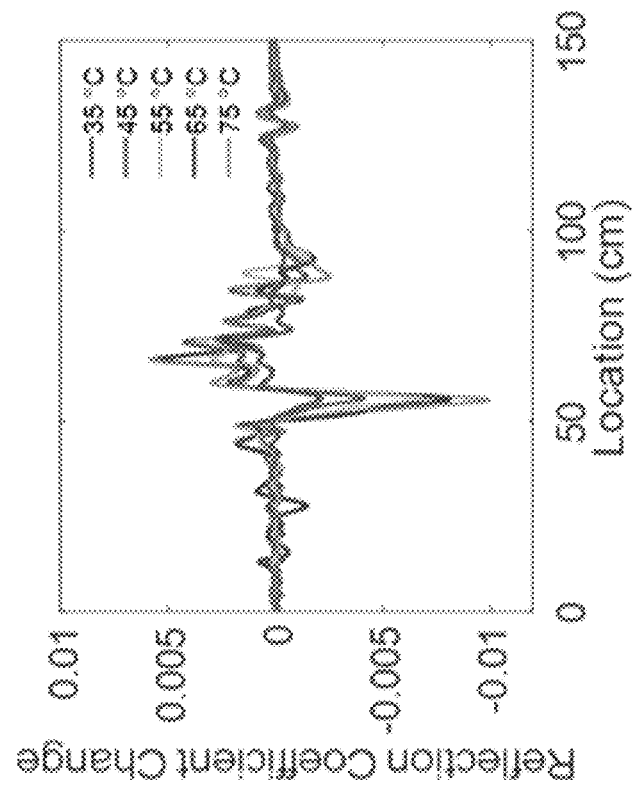

The second sensing material we selected is PVDF. Due to the semi-crystalline nature of PVDF, we added a layer of PC on the outside of PVDF to help maintain continuous drawing of the fiber. The PVDF has a smaller thermal expansion coefficient but a large temperature dependence of its permittivity. It is expected that when the PVDF fiber is heated, the impedance of the heated segment will decrease, thus generating a negative-positive peak pair. The experiment result confirmed the assumption, and the fiber has a temperature sensitivity of $2.0\times10^{-4\circ}$ $C.^{-1}$, as shown in FIGS. 8A-8C. The fiber also has a similar temperature resolution of $2.7°$ C. but the reflected signal is less uniform. The probable reason is that PVDF did not converge fully to the copper electrode on one side. Detailed results are included in the supplement information.

It was observed that the measurement time was a few seconds with VNA HP 8753D and 216 ms with VNA R&S ZVA50. The actual temperature response time is also limited by the heat transfer efficiency between the fiber and the environment. While LDPE and PVDF were chosen in this work because they have larger thermal response compared to other common thermoplastic polymers, we believe that using additives in the polymer or composite material to further improve the fiber sensitivity is possible. Additionally, although the measurements included in this manuscript were conducted with vector network analyzers, we are working on a customized interrogation unit that is smaller and cheaper thus more suitable for wearable applications.

4. Parallel Wire Model for Disclosed Electrode-Embedded Fibers

The transmission line theory is used to describe the parallel wire model for the electrode-embedded fibers (see D. M. Pozar, *Microwave engineering*; Wiley India: New Delhi, 2017). The fiber can be viewed as a cascade of infinitesimal segments, and each segment is a lumped-element circuit. The equivalent circuit has four parameters R, L, G, and C, representing the resistance, inductance, conductance, and capacitance per unit length. For a two-wire fiber whose electrodes are surrounded by dielectric materials, when the wire diameter is d, and the distance between the wires is D, the parameters are given as follows in the equations given below.

$$R = 2R_s/\pi d$$

$$L = \mu/\pi \cdot \mathrm{acos}(D/d)$$

$$G = \pi\sigma/\mathrm{acos}(D/d)$$

$$C = \pi\in/\mathrm{acos}(D/d)$$

In the foregoing, $R_s = \sqrt{\omega\mu/2\sigma_c}$ is the surface resistivity of the electrodes, and $\in$ is the permittivity of the dielectric material. $\sigma$ and $\sigma_c$ are the conductivity of the dielectric material and the electrode material. $\mu$ is the permeability constant, and $\omega$ is the angular frequency of the electromagnetic wave. The characteristic impedance of the transmission line is the ratio of the amplitude of voltage and current of a single-frequency wave propagating along the line. It is determined by the geometry and the materials of the transmission line. For the two-wire system, the impedance is calculated by applying Equation (1) above.

5. Frequency Domain Reflectometry

There are several types of Frequency Domain Reflectometry, and the method used in this work is Phase-Detection Frequency Domain Reflectometry (PD-FDR). For the PD-FDR method, a set of stepped-frequency sine waves are launched to the transmission line, and the amplitude and phase information of the return signal is collected. The frequency response is used in an inverse Fourier Transform to acquire the time-domain information [2], and the reconstructed signal represents the reflection coefficient at each point. The mathematical derivation as given in J. Huang, et al. (J. Huang, et al., IEEE Sensors Journal 2016, 16, 4495). Consider a waveform as given therein as shown below.

$$V_o = A \cdot \exp\{j(\omega t + \varphi)\},$$

in which t is the time; $V_0$ is the voltage; A is the amplitude; $\varphi$ is the initial phase; $\omega$ is the angular frequency of the sine wave. Thus, the total voltage received is the summation of the individual reflections as shown below.

$$V_{total} = \Sigma_{i=1}^{N} V_{o,i}(t, z_i),$$

where N denotes the number of reflectors, $z_i$ represents the location of the i-th reflector, and the voltage component is given by equation shown below.

$$V_{o,i}(t,z_i) = \Gamma_i A \cdot \exp\{j[\omega(t-2z_i\sqrt{\epsilon}/c)+\varphi]\},$$

where $\Gamma_i$ denotes the reflection coefficient of the i-th reflector; c denotes the speed of EM wave in vacuum and $\epsilon$ is the relative permittivity. The frequency response of the transmission line under test is given by the equation below.

$$H(\omega) = V_{total}/V_o = \sum_{i=1}^{N} \Gamma_i \cdot \exp[j(-2z_i\sqrt{\epsilon}\,\omega/c)]$$

By sweeping the frequency from $\omega_{min}$ to $\omega_{max}$ the time-domain response of the system can be calculated by an inverse Fourier transform equation given below.

$$h(tt) = \frac{1}{2\pi}\int_{\omega_{min}}^{\omega_{max}} H(\omega)\cdot\exp(j\omega t)d\omega = \sum_{i=1}^{N} \Gamma_i \cdot \text{sinc}[(\omega_{max}-\omega_{min})(t-\tau_i)],$$

where $\tau_i = 2z_i\sqrt{\epsilon}/c$ is the delay of the signal of the i-th reflector. From Equation S6, we can see that the amplitude of each sinc function is proportional to the reflection coefficient of the reflection point and the location of the reflection can be calculated from the delay time. In an FDR system, the measurement range and the spatial resolution is determined by the frequency scanning range and step. The following formula dictates the relationship:

$$\text{Range} = \left(\frac{1}{\Delta f}\right) \times VF \times c = \frac{N-1}{\Delta F} \times VF \times c, \text{ and}$$

$$\text{Pulse width} \approx 1/\Delta F$$

where $\Delta f$ is the frequency step, VF is the velocity factor, c is the speed of light, N is the number of steps, and $\Delta F$ is the difference between the minimum and maximum frequency. The VNA used in this work has a maximum of 1601 frequency steps thus a frequency scanning range from 3 MHz to 4803 MHz with a 3 MHz step was selected. When the velocity factor is 0.69, from foregoing equations, it can be calculated the detection range is 69/2=34.5 m, and the spatial resolution is 2.2 cm.

6. Fiber Transmission Loss

The fiber constitutes a parallel wire transmission line, and the transmission attenuation as given by D. M. Pozar in *Microwave engineering*; Wiley India: New Delhi, 2017.

$$\alpha \approx \frac{R}{2}\cdot\sqrt{\frac{C}{L}} + \frac{G}{2}\cdot\sqrt{\frac{L}{C}} \approx \qquad \text{(Equation 5)}$$

$$\frac{R}{2Z_0} \approx \sqrt{\frac{f\pi\epsilon}{\sigma_c}} \cdot 1/\left[d\cdot\text{acosh}\left(\frac{D}{d}\right)\right]$$

Figure 7B:
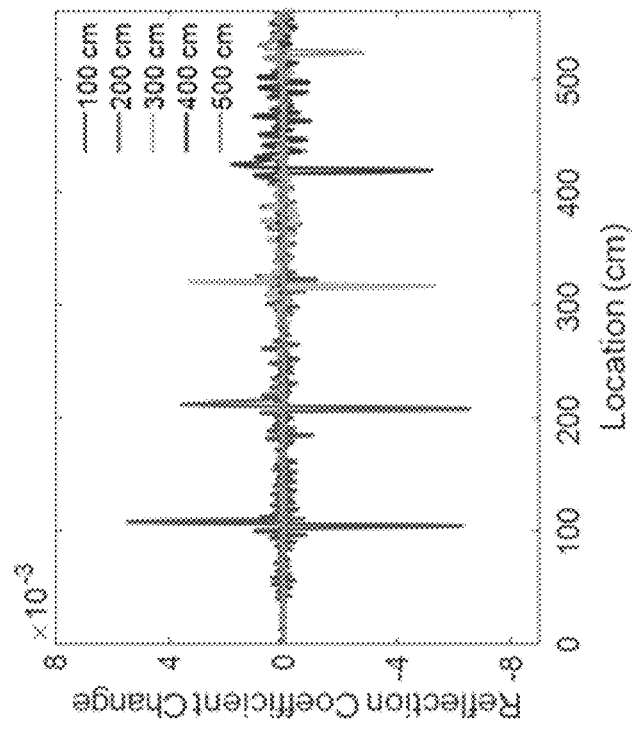
FIGS. 7A-7B show representative response data of obtained using a disclosed pressure sensing fiber with pressure applied at locations 100 cm apart.
Figure 7A:
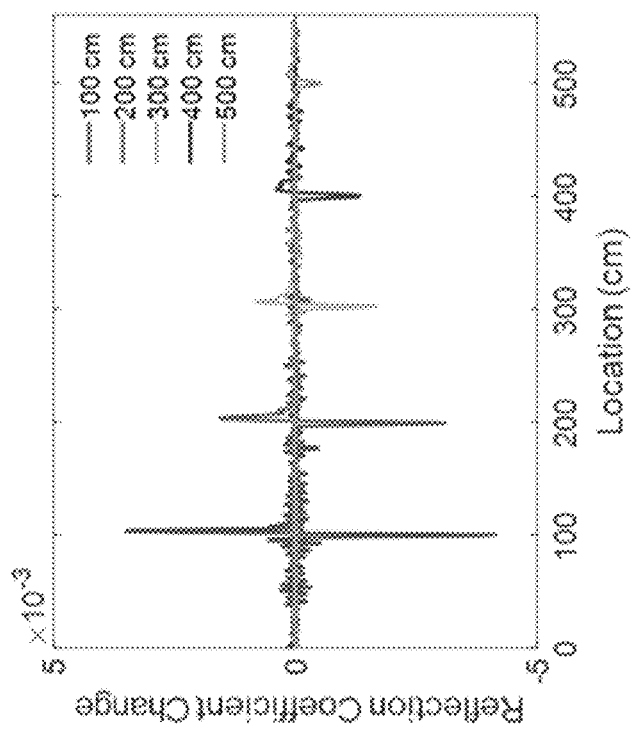

If a fiber has two 125 μm diameter electrodes that are 600 μm apart from each other, given a relative permittivity of 2, and the copper's conductivity of $5.96\times10^7$ S·m$^{-1}$, the attenuation at 1 GHz is 0.11 Np·m$^{-1}$. The attenuation, as shown in Equation 5, is proportional to the square root of the frequency. FIG. 7A shows the measurement results of a TPE fiber when an identical 20-gram weight was applied at different locations. As the location moved further from the start of the fiber, the pressure induced peak pair became smaller and wider. In order to correct attenuation-related error, the time-domain signal acquired by VNA was transformed back to the frequency domain, and the inverse of attenuation coefficient was multiplied to the Fourier transform to cancel the effect of the transmission loss. The corrected frequency domain signal was then transformed back to the time domain, and the result is shown in FIG. 7B. The height of the negative peak of the first four peak pairs are more uniform, and it confirms that the correction method is effective.

7. PVDF Fiber for Temperature Measurement

A PVDF fiber comprising a PC cladding to ensure stable drawing was prepared. Briefly, a 0.75 inch PVDF rod was drilled with two hollow channels and then wrapped with PC films to 1 inch. After heating in the oven for the tightly wrapped PC film to consolidate into a solid tube, the preform was drawn in the fiber draw tower at 280° C. The cross section image is shown in FIG. 8A. The fiber was connected to the VNA with a 5 cm segment being heated in a furnace from room temperature to 75° C. As discussed in the previous sections, the heated section has a smaller characteristic impedance thus the reflection pattern is consisted of a negative-positive peak pair. The reflection coefficient change is shown in FIG. 8B, and the peak pairs' height increase with temperature can be observed. The temperature response is twice compared to that of the LDPE fiber, but the signal is also noisier. The calibration curve is shown in FIG. 8C.

8. Pressure and Temperature Measurement Apparatus

Figure 9A:
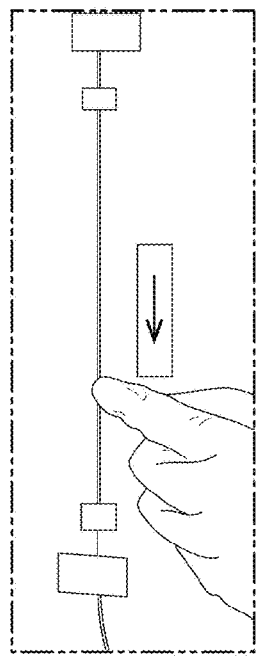
FIGS. 9A-9D show a representative device for obtaining pressure and temperature measurements from disclosed pressure and temperature sensing fibers.
Figure 9B:
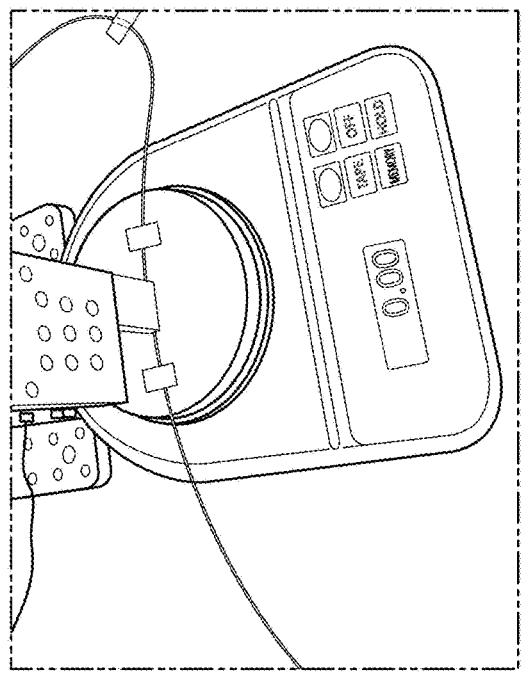
Figure 9C:
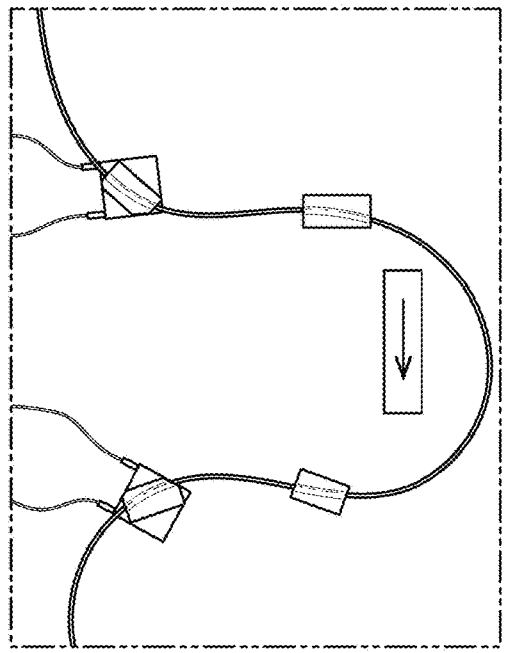
Figure 9D:
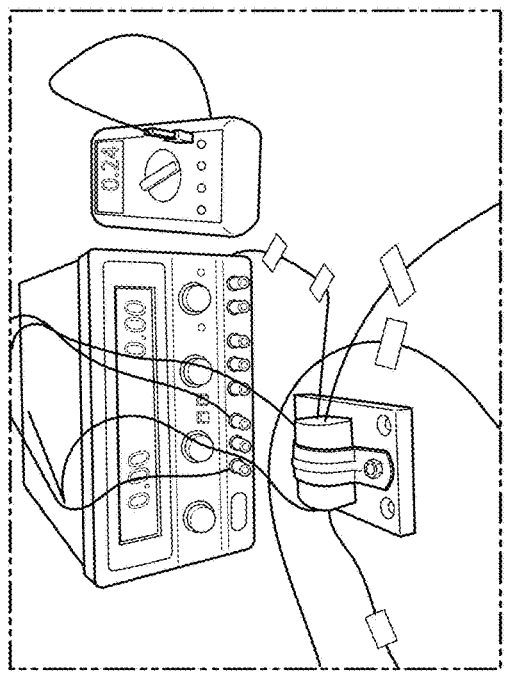

A representative pressure and temperature measurement apparatus is shown in FIGS. 9A-9D which show a representative device for obtaining pressure and temperature measurements from disclosed pressure and temperature sensing fibers. FIG. 9A is a photographic image of a finger pressing a disclosed pressure sensing fiber to calibrate the time delay vs. distance relationship. FIG. 9B is a photographic image showing a representative apparatus for applying pressure comprising a disclosed pressure sensing fiber is fixed on top of a digital scale and a linear stage comprising a polymer block to apply uniform pressure to the fiber in which force can be determined by the scale reading. FIG. 9C is a photographic image showing two segments of a disclosed temperature-sensing fiber attached to two TECs so they can be heated or cooled independently. FIG. 9D is a photographic image showing a representative apparatus for temperature calibration comprising a disclosed temperature sensing fiber passed through a 5 cm small tube furnace; a power supply providing DC current to the furnace; and a thermocouple to measure the temperature inside the furnace.

Disclosed herein in the Examples are experimental aspects of disclosed multi-material polymer fibers that can provide for distributedly measuring temperature and pressure. The spatial resolution of the two fibers is at least 2.2 cm using a representative exemplary detection scheme, and a pressure sensitivity of a representative TPE fiber is at least 4 kPa using a representative exemplary detection scheme. Further representative examples comprising LDPE fiber and PVDF fiber can resolve temperature change at least 2° C. and 2.7° C. using a representative exemplary detection scheme. These examples demonstrate that combining thermal drawing of functional fiber and reflectometry based distributed sensing scheme can provide cost-effective sensing solutions useful in a variety of articles, e.g., consumer wearable devices.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A fiber comprising:
   a supporting material surrounding an electrode assembly comprising an inter-electrode material surrounding at least two electrodes;
   wherein the at least two electrodes are separated by an inter-electrode distance; wherein the at least two electrodes are arranged parallel to one another;
   wherein the at least two electrodes are parallel to an outer surface of the fiber;
   wherein the fiber has a pressure sensitivity from about 0.1 kPa to about 20 kPa determined using electrical reflectometry to interrogate impedance change along the fiber; or wherein the fiber has a temperature sensitivity from about 0.1° C. to about 10° C. determined using electrical reflectometry to interrogate impedance change along the fiber.

2. The fiber of claim 1, wherein the at least two electrodes are two electrodes.

3. The fiber of claim 1, wherein the supporting material and inter-electrode material are essentially not the same material.

4. The fiber of claim 1, wherein the supporting material is a polymer, a ceramic material, a silica, a glass material, or combinations thereof.

5. The fiber of claim 4, wherein the polymer is a polyester, a polyether, a polycarbonate, a polyolefin, a polyetherimide, a vinyl polymer, a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

6. The fiber of claim 1, wherein the supporting material has a Young's modulus of from about 10 KPa to about 100 GPa.

7. The fiber of claim 1, wherein the inter-electrode material is a polymer, a ceramic material, a silica, or combinations thereof.

8. The fiber of claim 7, wherein the polymer is a polyester, a polyether, a polycarbonate, a polyolefin, a polyetherimide, a vinyl polymer, a styrenic block copolymer, a copolyester, a polyamide, a polyolefin blend, a polyolefin alloy, a styrene butadiene styrene copolymer, a styrene ethylene butylene styrene copolymer, a polyurethane, combinations thereof, or copolymers thereof.

9. The fiber of claim 1, wherein the inter-electrode material has a Young's modulus of from about 10 KPa to about 100 GPa.

10. The fiber of claim 1, wherein each of the at least two electrodes comprises a material independently selected from copper, gold, aluminum, silver, tungsten, steel, combinations thereof, or alloys thereof.

11. The fiber of claim 1, wherein the fiber has a cross-sectional geometry that is circular, rectangular, square, triangular, or ovular.

12. An article comprising the fiber of claim 1.

13. The article of claim 12, wherein the article is a yarn or a fabric.

14. The article of claim 13, wherein the fabric is a woven fabric, non-woven fabric, or knit fabric.

15. The article of claim 12, wherein the article is a fabric, a bandage, a wound dressing, a medical device, or an article of clothing.

16. A device for distributed sensing comprising:
   the fiber of claim 1 configured to connect to a device for measuring impedance variation.

17. The device of claim 16, wherein the device for measuring impedance variation is an electrical reflectometry device.

18. The device of claim 16, wherein the device determines change in pressure along the fiber, or wherein the device determines change in temperature along the fiber.

19. A method of fabricating the fiber of claim 1, the method comprising:
   thermally drawing a preform comprising a supporting material surrounding a pre-form electrode assembly comprising an inter-electrode material surrounding at least two electrode channels;
   wherein each of the at least two electrode channels comprises an electrode;
   wherein the two channels are separated by an inter-electrode distance;
   wherein the two channels are arranged parallel to one another; and
   wherein the two channels are parallel to an outer surface of the preform.

* * * * *